(12) United States Patent
Dickie et al.

(10) Patent No.: US 7,607,724 B2
(45) Date of Patent: Oct. 27, 2009

(54) COLLAPSIBLE SUPPORT STRUCTURE

(75) Inventors: Robert G. Dickie, Newmarket (CA); Steve A. Copeland, Barrie (CA)

(73) Assignee: Promen-Aid Innovations Ltd., Montreal, Quebec (CA)

( * ) Notice: Subject to any disclaimer, the term of this patent is extended or adjusted under 35 U.S.C. 154(b) by 32 days.

(21) Appl. No.: 11/838,523

(22) Filed: Aug. 14, 2007

(65) Prior Publication Data

US 2008/0042474 A1 Feb. 21, 2008

Related U.S. Application Data

(63) Continuation-in-part of application No. 11/504,925, filed on Aug. 16, 2006.

(51) Int. Cl.
*A47C 4/00* (2006.01)
(52) U.S. Cl. .................. 297/16.1; 297/16.2; 297/35; 297/42; 297/45; 297/46
(58) Field of Classification Search .............. 297/16.1, 297/16.2, 35, 42, 45, 46
See application file for complete search history.

(56) References Cited

U.S. PATENT DOCUMENTS

| | | | | |
|---|---|---|---|---|
| 722,166 | A * | 3/1903 | Taft | 254/8 R |
| 2,041,615 | A * | 5/1936 | Maslowski | 248/421 |
| 2,625,207 | A | 1/1953 | Duke | |
| 2,821,242 | A * | 1/1958 | Manegold | 248/421 |
| 3,822,913 | A | 7/1974 | Raver | |
| 3,968,991 | A | 7/1976 | Maclaren | |
| 4,025,088 | A | 5/1977 | Rothschild | |
| 4,047,752 | A | 9/1977 | Rohr | |
| 4,052,087 | A | 10/1977 | Gagliardi | |
| 4,232,901 | A * | 11/1980 | Harrington et al. | 297/423.45 |
| 4,258,951 | A | 3/1981 | Groom | |
| 4,415,177 | A | 11/1983 | Hale et al. | |
| 4,712,830 | A | 12/1987 | Charbrol et al. | |
| 4,826,241 | A | 5/1989 | Barras | |
| 5,161,812 | A * | 11/1992 | DeWeese | 280/47.38 |
| 5,188,383 | A | 2/1993 | Thompson | |
| 5,285,992 | A * | 2/1994 | Brown | 248/421 |
| 5,695,248 | A * | 12/1997 | Bell | 297/344.17 |
| 5,765,916 | A * | 6/1998 | Patel | 297/344.13 |
| 5,857,688 | A | 1/1999 | Swearingen | |
| 6,155,579 | A | 12/2000 | Eyman et al. | |
| 6,231,119 | B1 | 5/2001 | Zheng | |
| 6,264,271 | B1 | 7/2001 | Munn et al. | |
| 6,467,788 | B1 | 10/2002 | Li et al. | |
| 6,572,133 | B1 | 6/2003 | Stevens | |
| 6,575,422 | B1 | 6/2003 | Zheng | |

(Continued)

FOREIGN PATENT DOCUMENTS

WO WO 00/43709 7/2000

*Primary Examiner*—Laurie K Cranmer
(74) *Attorney, Agent, or Firm*—Ogilvy Renault LLP

(57) ABSTRACT

An apparatus including a support structure movable between an erected position and a collapsed position and including a threaded shaft, a first collapsible assembly having a first portion pivotally mounted on the threaded shaft, a second collapsible assembly having a second portion pivotally mounted on the threaded shaft, where at least one of the first and second portions is threadably engaged to the threaded shaft such that the first and second portions are relatively movable toward and away from each other through a rotation of the threaded shaft to move the support structure between the erected and collapsed positions.

21 Claims, 35 Drawing Sheets

U.S. PATENT DOCUMENTS

| | | |
|---|---|---|
| 6,698,827 B2 * | 3/2004 | Le Gette et al. ............ 297/16.2 |
| 6,776,433 B2 | 8/2004 | Harrison et al. |
| 6,811,178 B2 * | 11/2004 | Tomasi et al. ............... 280/650 |
| 6,820,927 B2 | 11/2004 | Isom et al. |
| 6,938,911 B1 | 9/2005 | Shyu et al. |
| 7,048,236 B2 * | 5/2006 | Benden et al. .............. 248/121 |
| 7,055,840 B1 * | 6/2006 | Kelso ...................... 280/250.1 |
| 7,195,310 B2 | 3/2007 | Reese |

* cited by examiner

COLLAPSIBLE SUPPORT STRUCTURE

CROSS-REFERENCE TO RELATED APPLICATION

The present application is a continuation-in-part of U.S. patent application Ser. No. 11/504,925, filed Aug. 16, 2006, the entire contents of which is incorporated herein by reference.

FIELD OF THE INVENTION

The present invention relates to a collapsible support structure. More particularly, the present invention relates to such a support structure used with collapsible chairs or the like.

BACKGROUND ART

Collapsible frames and particularly those used with chairs are well known in the art. There are a variety of collapsible wheelchairs, sports chairs, strollers and the like. It is greatly desirable to provide such a chair or the like which provides substantial structural strength and which collapses into the smallest possible space. The ideal collapsible frame also keeps the weight thereof to a minimum. In the prior art, there are a variety of chairs which collapse in two dimensions and some that collapse in three dimensions as well. However, there is a need in the art for an improved collapsible structure which addresses the various issues noted above and provides the structural integrity required to handle the forces involved in rolling a wheel chair.

SUMMARY OF INVENTION

It is therefore an aim of the present invention to provide an improved collapsible structure.

Therefore, in accordance with the present invention, there is provided an apparatus comprising a support structure movable between an erected position and a collapsed position and comprising a threaded shaft, a first collapsible assembly having a first portion pivotally mounted on the threaded shaft, a second collapsible assembly having a second portion pivotally mounted on the threaded shaft, at least one of the first and second portions being threadably engaged to the threaded shaft such that the first and second portions are relatively movable toward and away from each other through a rotation of the threaded shaft to move the support structure between the erected and collapsed positions.

Also in accordance with the present invention, there is provided a collapsible chair being alternately configurable in an erected position and a collapsed position, the chair comprising a rotatable threaded shaft, first and second hubs threadably engaged to the threaded shaft to be relatively movable therealong in opposite directions during movement between the erected and collapsed positions through rotation of the threaded shaft, a first collapsible assembly pivotally mounted on the first hub, a second collapsible assembly pivotally mounted on the second hub, and a seat member having one end supported by the first collapsible assembly and an opposed end supported by the second collapsible assembly.

BRIEF DESCRIPTION OF THE DRAWINGS

Reference will now be made to the accompanying drawings, showing by way of illustration a particular embodiment of the present invention and in which.

Similar numbers refer to similar parts throughout the drawings.

DETAILED DESCRIPTION OF PARTICULAR EMBODIMENTS

Referring to FIGS. 1-15, a chair according to a particular embodiment of the present invention is generally shown at 10. Chair 10 is moveable between an erected position shown in FIGS. 1-6 and a collapsed position shown in FIGS. 12-15. Chair 10 will initially be described as seen in the erected position.

Figure 1:
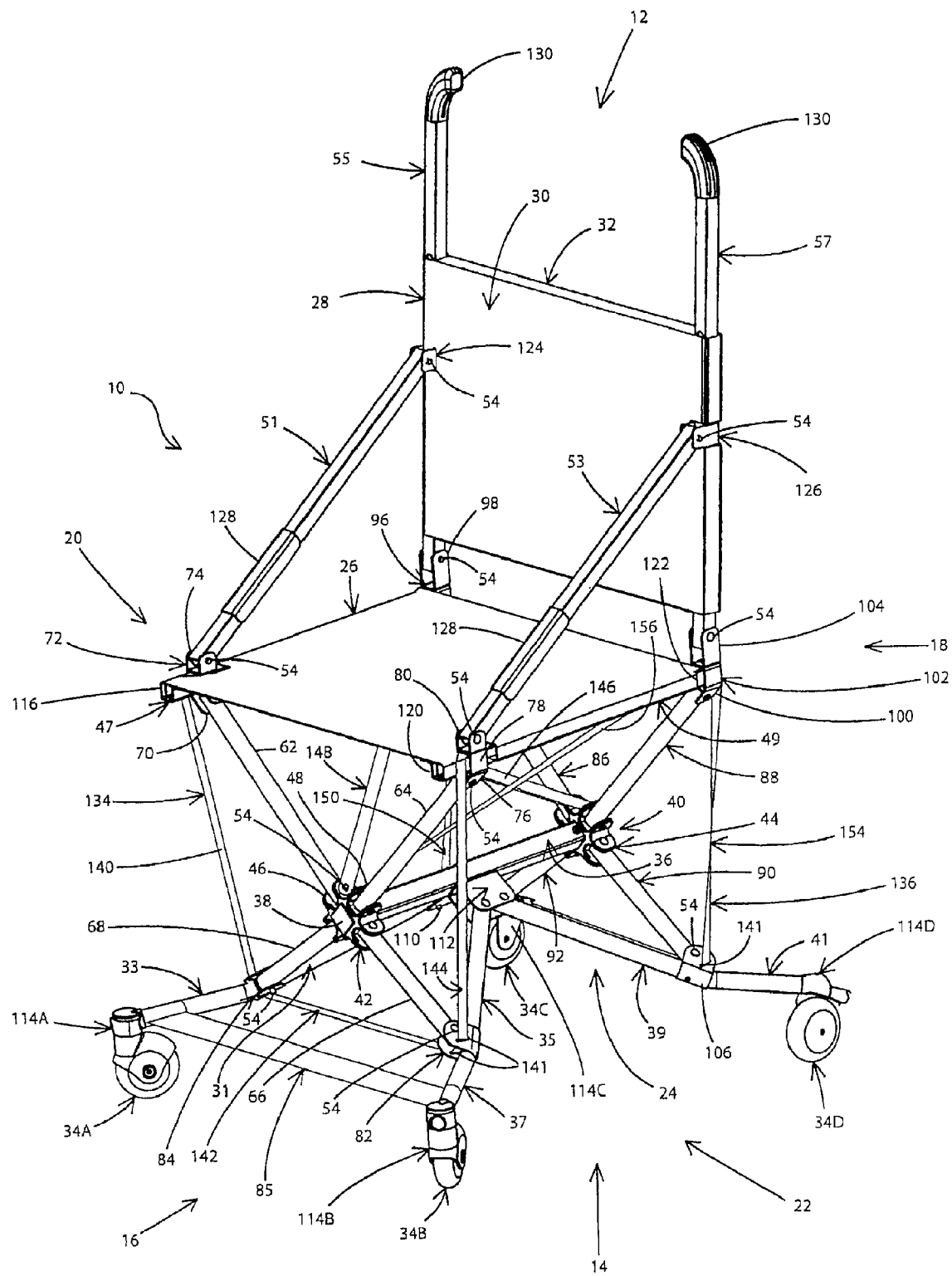
FIG. 1 is a perspective view of a chair in accordance with a particular embodiment of the present invention.
Figure 2:
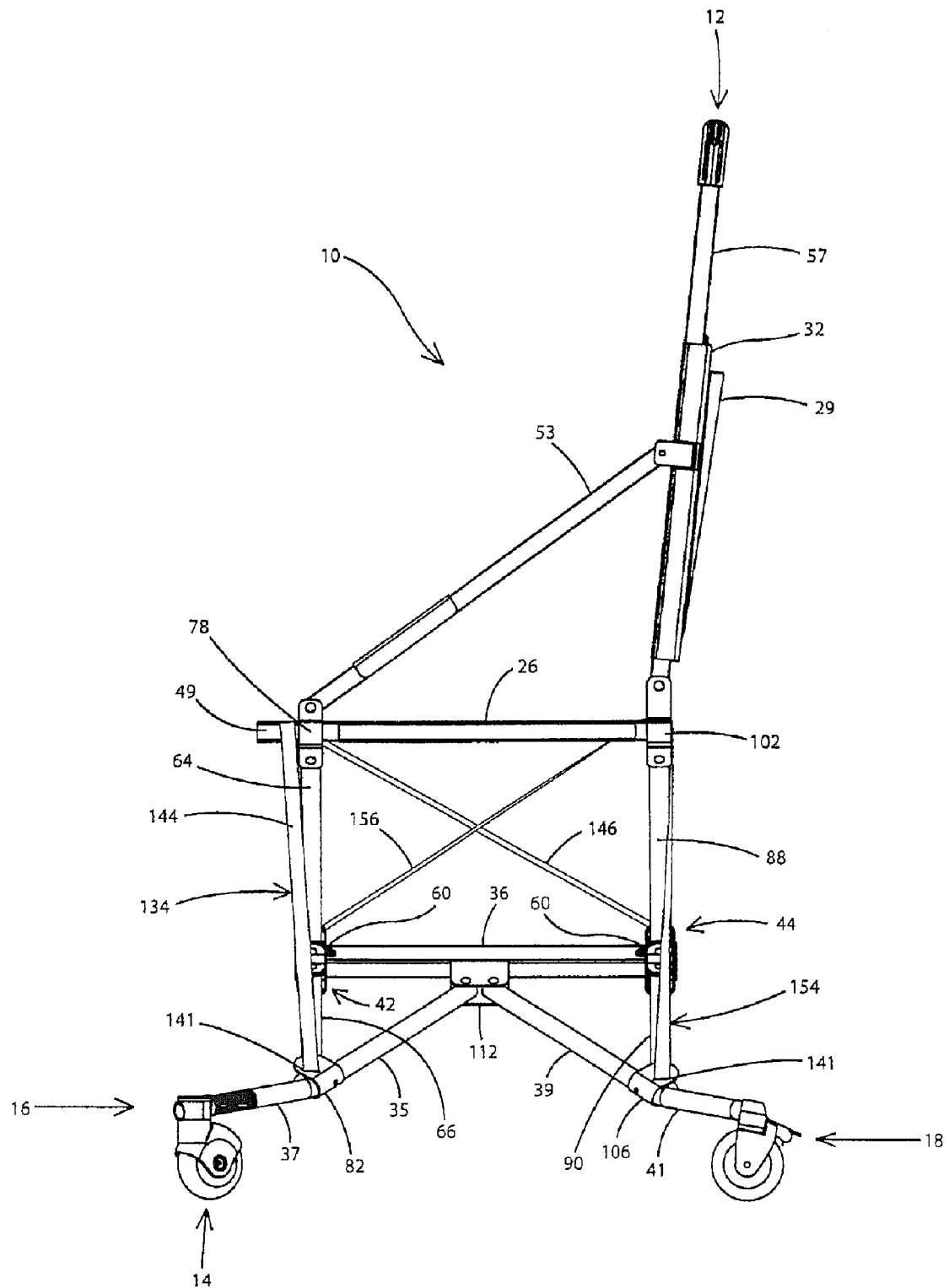
FIG. 2 is a side elevational view of the chair of FIG. 1.
Figure 3:
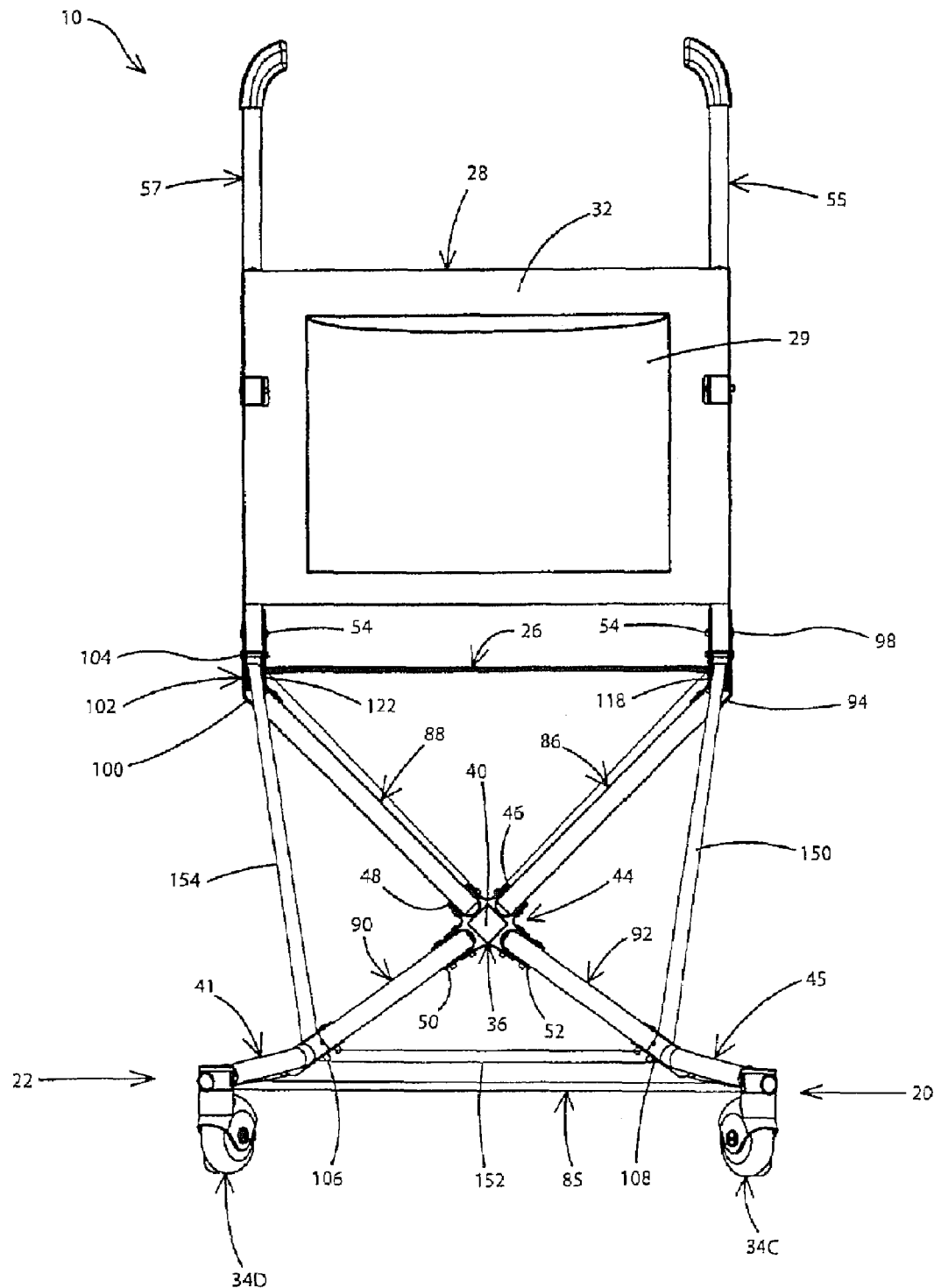
FIG. 3 is a rear elevational view of the chair of FIG. 1.

Referring to FIGS. 1-3, chair 10 has a top 12, a bottom 14, a front 16, a rear 18 and first and second sides 20 and 22. Top 12 and bottom 14 define therebetween a vertical direction, front 16 and rear 18 define therebetween an axial direction perpendicular to the vertical direction, and sides 20 and 22 define therebetween a longitudinal direction which is perpendicular to the vertical direction and the axial direction. Thus, FIG. 2 views chair 10 in the longitudinal direction, FIG. 3 views chair 10 in the axial direction and FIG. 5 views chair 10 in the vertical direction.

Chair 10 includes a frame 24, a flexible seat member 26 mounted on frame 24, a flexible back member 28 mounted on frame 24 and including front and rear panels 30 and 32, and four wheels 34A-D mounted on frame 24. A pocket 29 (FIGS. 2-3) is mounted on rear panel 32. Frame 24 includes a plurality of elongated members or poles which are most preferably formed as hollow tubular members in order to minimize weight. Frame 24 also provides a plurality of mounts to provide pivotal connections between the various poles.

More particularly, frame 24 includes a rigid elongated member or main spar 36 having front and rear ends 38 and 40 between which spar 36 is elongated in the axial direction. Frame 24 also comprises four leg assemblies which include wheels 34A-D and four rigid leg members each having a leg and a foot. More particularly, frame 24 includes a first leg 31 with a first foot 33 rigidly connected thereto, a second leg 35 with a second foot 37 rigidly connected thereto, a third leg 39 with a third foot 41 rigidly connected thereto and a fourth leg 43 (FIGS. 3A and 5) with a fourth foot 45 rigidly connected thereto. Each foot is bent or angled upwardly a small amount relative to the respective leg. A flexible collapsible foot rest 85 extends between and is connected to feet 33 and 37. Frame 24 further includes first and second seat poles 47 and 49, first and second rigid arm poles 51 and 53, and first and second rigid back poles 55 and 57. Frame 24 also includes a pantographic assembly 59 (FIG. 6) which extends between and is connected to first and second back poles 55 and 57.

Figure 1A:
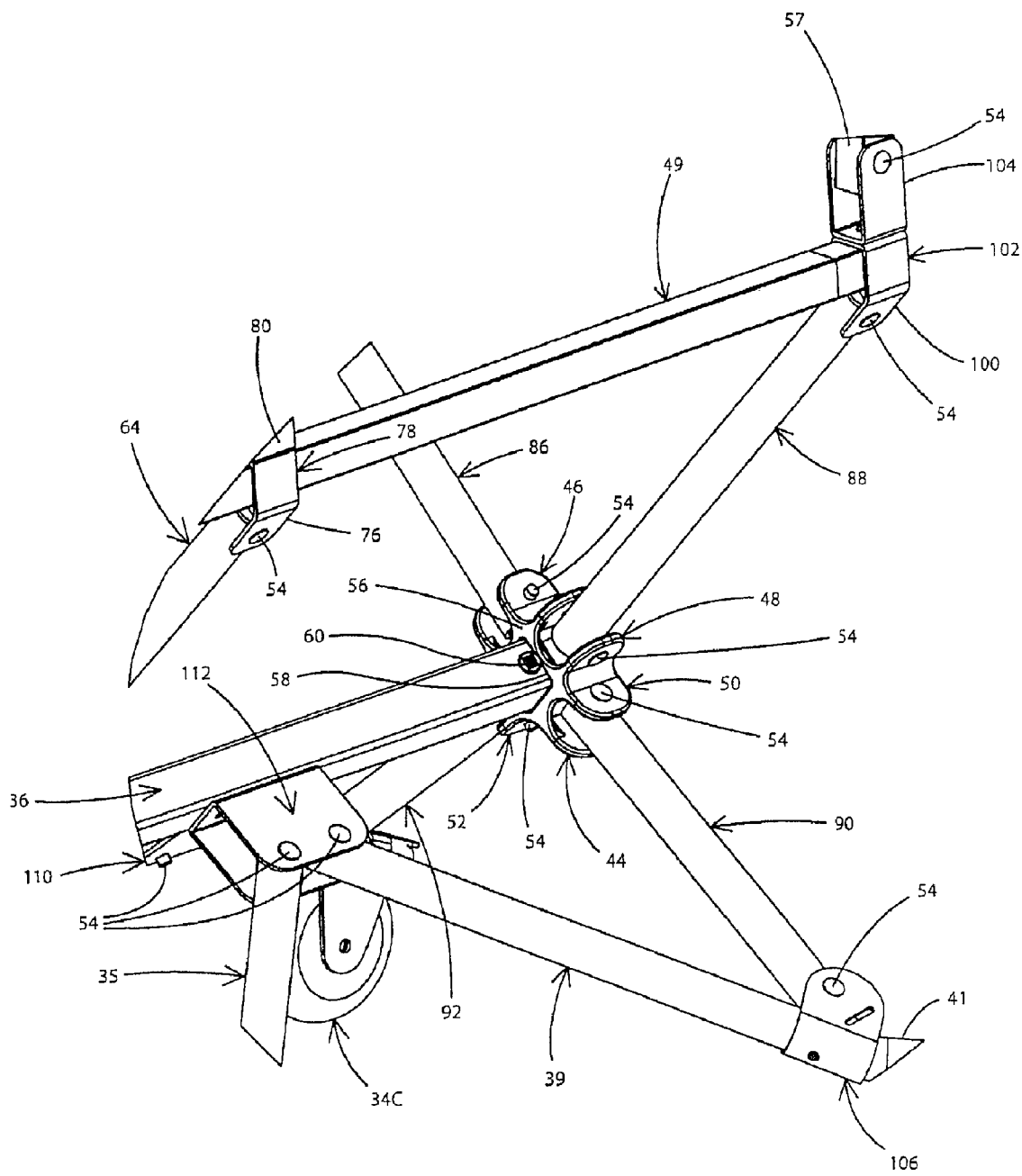
FIG. 1A is an enlarged perspective fragmentary view of the chair of FIG. 1 showing the rear hub region of the chair with the tension straps removed.

Frame 24 further includes front and rear hubs 42 and 44, each of which is slidably mounted on spar 36 so that each of the hubs is axially moveable toward and away from one another during movement between the erected and collapsed positions. As best shown in FIG. 1A, each hub includes a first mount 46, a second mount 48, a third mount 50 and fourth mount 52, each of which has a respective pivot 54. Each of said mounts extends radially outwardly from a central body 56 which defines a through opening 58 in which spar 36 is received whereby each hub is slidable along spar 36. Mounted on spar 36 is a securing mechanism which includes a pair of buttons 60 which extend from inside spar 36 through respective holes formed therein and outwardly of spar 36 to prevent the hubs from moving inwardly toward one another. Each button 60 is disposed adjacent a respective hub, is spring biased outwardly and may be depressed manually in order to allow the hubs to slide along spar 36 toward one another.

Four rigid radiating front poles or struts are mounted on the front hub 42 and extend radially outwardly from hub 42 and from spar 36. More particularly, first, second, third and fourth struts 62, 64, 66 and 68 are pivotally connected to front hub 42 via respective mounts and pivots, each strut respectively pivoting about a single axis. More particularly each strut has an inner end adjacent which it is pivotally connected on hub 42 via the respective pivots 54. Struts 62 and 64 are upper struts wherein strut 62 angles upwardly and toward first side 20 while strut 64 angles upwardly and toward second side 22 while. Struts 66 and 68 are lower struts wherein strut 66 angles downwardly toward side 22 and strut 68 angles downwardly toward side 20.

First strut 62 adjacent its outer or upper end is pivotally mounted to first seat pole 47 about a single axis via a pivot 54 (FIG. 5) and a lower mount 70 of a mounting bracket 72 which also includes an upper mount 74. Likewise, second strut 64 adjacent its outer or upper end is pivotally mounted on second seat pole 49 about a single axis via a pivot 54 and a lower mount 76 of a mounting bracket 78 which also includes an upper mount 80. Mounting brackets 72 and 78 are respectively rigidly mounted on first and second seat poles 47 and 49. Third strut 66 adjacent its outer or lower end is pivotally mounted about a single axis via a pivot 54 and a mounting bracket 82 which is rigidly connected to first leg 35 adjacent its intersection with first foot 37. Likewise, fourth strut 68 adjacent its outer or lower end is pivotally connected about a single axis to first leg 31 via a pivot 54 and a mounting bracket 84 which is rigidly connected to leg 31 adjacent its intersection with foot 33.

Frame 24 further includes four rigid radiating rear poles or struts which extend radially outwardly from spar 36 and rear hub 44, to which they are pivotally connected. More particularly, frame 24 includes fifth, sixth, seventh and eighth struts 86, 88, 90 and 92. Fifth strut 86 adjacent its inner end is pivotally connected to hub 44 via a pivot 54 and first mount 46 (FIG. 1A). Fifth strut 86 extends radially outwardly from hub 44 upwardly and toward side 20 of frame 24 and is pivotally connected adjacent its cuter or upper end about a single axis via a pivot 54 (FIG. 1A) and a lower mount 94 (FIGS. 5 and 10) of a mounting bracket 96 which includes an upper mount 98. Likewise, sixth strut 88 adjacent its inner or lower end is pivotally connected about a single axis to hub 44 via a pivot 54 and second mount 48 (FIG. 1A). Strut 88 extends upwardly and toward side 22 of frame 24 to its upper or outer end, adjacent which it is pivotally connected about a single axis via a pivot 54 (FIG. 1A) and a lower mount 100 of a mounting bracket 102 which includes an upper mount 104. Mounting bracket 102 is rigidly connected to second seat pole 49 adjacent a rear end thereof and mounting bracket 96 is likewise rigidly connected to first seat pole 47 adjacent a rear end thereof.

Seventh strut 90 is pivotally connected about a single axis to hub 44 via a pivot 54 and third mount 50 (FIG. 1A), from which strut 90 extends downwardly and laterally toward side 22. Strut 90 adjacent its outer or lower end is pivotally connected about a single axis via a pivot 54 and a mounting bracket 106 which is rigidly connected to third leg 39 adjacent its intersection with third foot 41. Likewise, eighth strut 92 adjacent its inner or upper end is pivotally connected about a single axis to hub 44 via a pivot 54 (FIG. 1A) and fourth mount 52. Strut 92 extends from hub 44 downwardly and laterally toward first side 20 of frame 24. Strut 92 adjacent its outer or lower end is pivotally mounted about a single axis on fourth leg 43 via a pivot 54 and a mounting bracket 108 (FIGS. 3 and 5) which is rigidly mounted on leg 43 adjacent its intersection with foot 45.

Legs 31, 35, 39 and 43 extend radially outwardly and downwardly from a central region comprising first and second central mounting members 110 (FIG. 5) and 112, each of which are rigidly mounted at the center of main spar 36. More particularly, leg 31 adjacent an inner or upper thereof is pivotally mounted on spar 36 about a single axis via pivot 54 and first bracket 110 and extends therefrom downwardly, forward and laterally toward side 20 toward bracket 84 and foot 33. Likewise, second leg 35 adjacent an inner or upper end thereof is pivotally mounted on spar 36 about a single axis via a forward pivot 54 and second bracket 112, from which leg 35 extends downwardly, forward and laterally toward side 22 to bracket 82 and foot 37. Third leg 39 is pivotally mounted on spar 36 about a single axis via a rear pivot 54 and second bracket 112, from which leg 39 extends downwardly, rearward and laterally outward toward side 22 to bracket 106 and foot 41. Likewise, fourth leg 43 (FIG. 5) is pivotally mounted on spar 36 about a single axis via rear pivot 54 and first bracket 110, from which leg 43 extends downwardly, rearward and laterally outwardly toward side 20 to bracket 108 and foot 45. Wheels 34A-D are respectively mounted on frame 24 via castor wheel mounting assemblies 114A-D, which in particular are connected respectively to feet 33, 37, 45 (FIG. 5) and 41 and are part of the leg assemblies. These castor assemblies thus allow the wheels to swivel, as is commonly known. The front wheel assemblies 114A and 114B include parking brakes.

Figure 5:
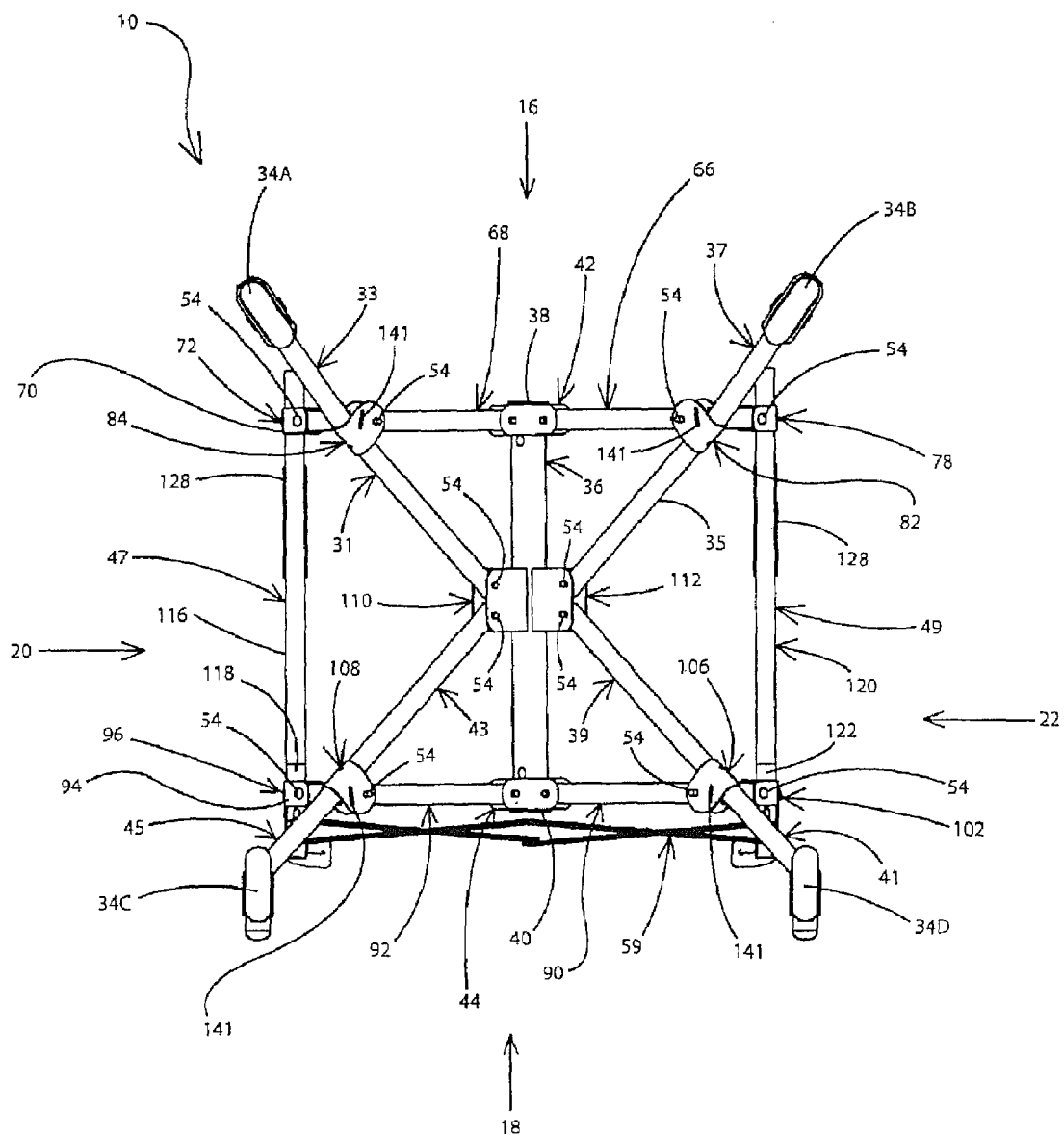
FIG. 5 is a bottom plan view of the chair of FIG. 1 with the seat member, back member and tension straps removed.

Feet 33, 37, 45 and 41 extend radially outwardly so that assemblies 114 and wheels 34 are disposed radially outwardly of the rest of frame 24. As seen in FIG. 5, wheels 34A and 34B both forward of hub 42, the various struts connected to hub 42 and the front ends of seat poles 47 and 49. Likewise, wheels 34C and D are disposed rearwardly of hub 44, the struts connected to hub 44 and the rear ends of seat poles 47 and 49. In addition, wheels 34A and 34C are disposed substantially laterally outwardly of seat pole 47 and contact the floor or other supporting surface at a position that is laterally outwardly of pole 37. Likewise, 34B and D are disposed substantially laterally outwardly of second seat pole 49 and contact the floor or other supporting surface at points which are laterally outwardly of pole 49. This configuration of wheels outside of the main portion of frame 24 provides for added stability.

Figure 8:
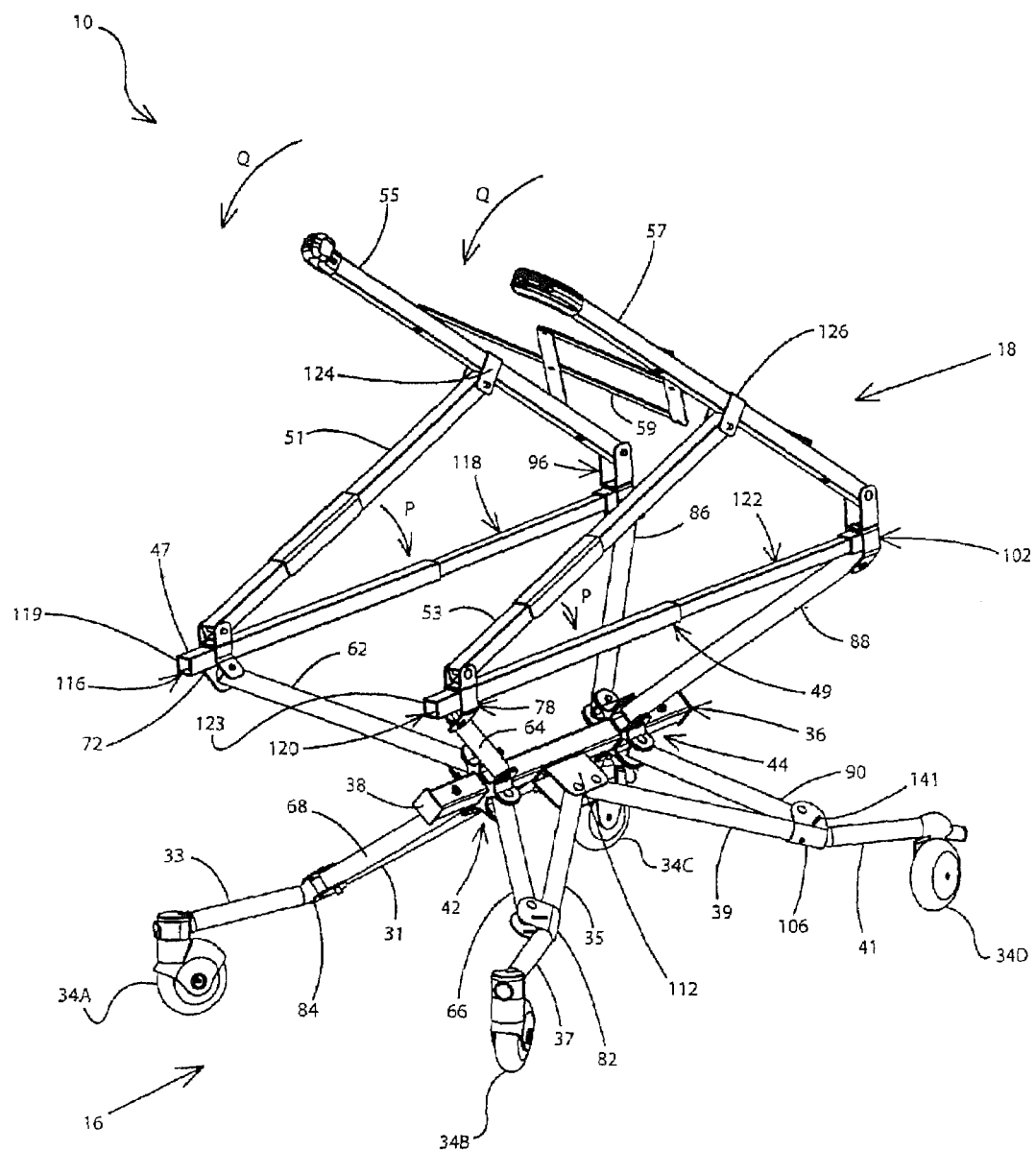
FIG. 8 is a perspective view showing the initial stage of collapse of FIG. 7.

The upper portion or zone of frame 24 is now described in greater detail. As best seen in FIG. 8, first seat pole 47 is a telescoping pole which includes first and second rigid leg segments 116 and 118 wherein segment 118 is slidably received in an elongated interior chamber 119 of segment 116. Likewise, second seat pole 49 is a telescoping pole which includes first and second rigid leg segments 120 and 122 wherein leg 122 is slidably received within an elongated interior chamber 123 of first segment 120. Thus, mounting bracket 96 is rigidly mounted on second leg segment 118, mounting bracket 102 is rigidly mounted on second leg segment 122, mounting bracket 72 is rigidly mounted on first leg segment 116 and mounting bracket 78 is rigidly mounted on first leg segment 120.

Returning to FIGS. 1-6, first arm pole 51 adjacent a front or lower end thereof is pivotally mounted about a single longitudinal substantially horizontal axis via a pivot 54 and upper mount 74. Arm pole 51 extends upwardly and rearwardly from mount 74 to an upper or rear end thereof, adjacent which arm pole 51 is pivotally mounted about a single substantially horizontal axis via a pivot 54 and a mounting bracket 124 which is rigidly connected to first back pole 55. Likewise, second arm pole 53 is pivotally mounted on second seat pole 49 about a substantially horizontal axis via a pivot 54 and upper mount 80. Second arm pole 53 extends upwardly and rearwardly from mount 80 to an upper or rear end thereof adjacent which pole 53 is pivotally mounted about a substantially horizontal axis on second back pole 57 via a pivot 54 and a mounting bracket 126 which is rigidly connected to second back pole 57. Thus, first arm pole 51 at mount 74 and second arm pole 53 at mount 80 are pivotable about a common axis. Likewise, arm poles 51 and 53 respectively at mounting brackets 124 and 126 are pivotable about a common axis. A pair of hand grips 128 are respectively mounted on first and second arm poles 51 and 53.

First back pole 55 is pivotally mounted on first seat pole 47 about a single substantially horizontal axis via a pivot 54 and upper mount 98. Likewise, second back pole 57 is pivotally mounted on second seat pole 49 about a single substantially horizontal axis via a pivot 54 and upper mount 104. Thus, back poles 55 and 57 are pivotally mounted via mounts 98 and 104 about a common axis. Back poles 55 and 57 extend upwardly and slightly rearwardly respectively from mounts 98 and 104 to respective upper ends, to which are respectively connected a pair of arcuate handles 130 which extend upwardly and curve toward one another. Handles 130 are configured for pushing chair 10 on wheels 34. Portions of back poles 55 and 57 extend upwardly above the top of back member 28.

Figure 6:
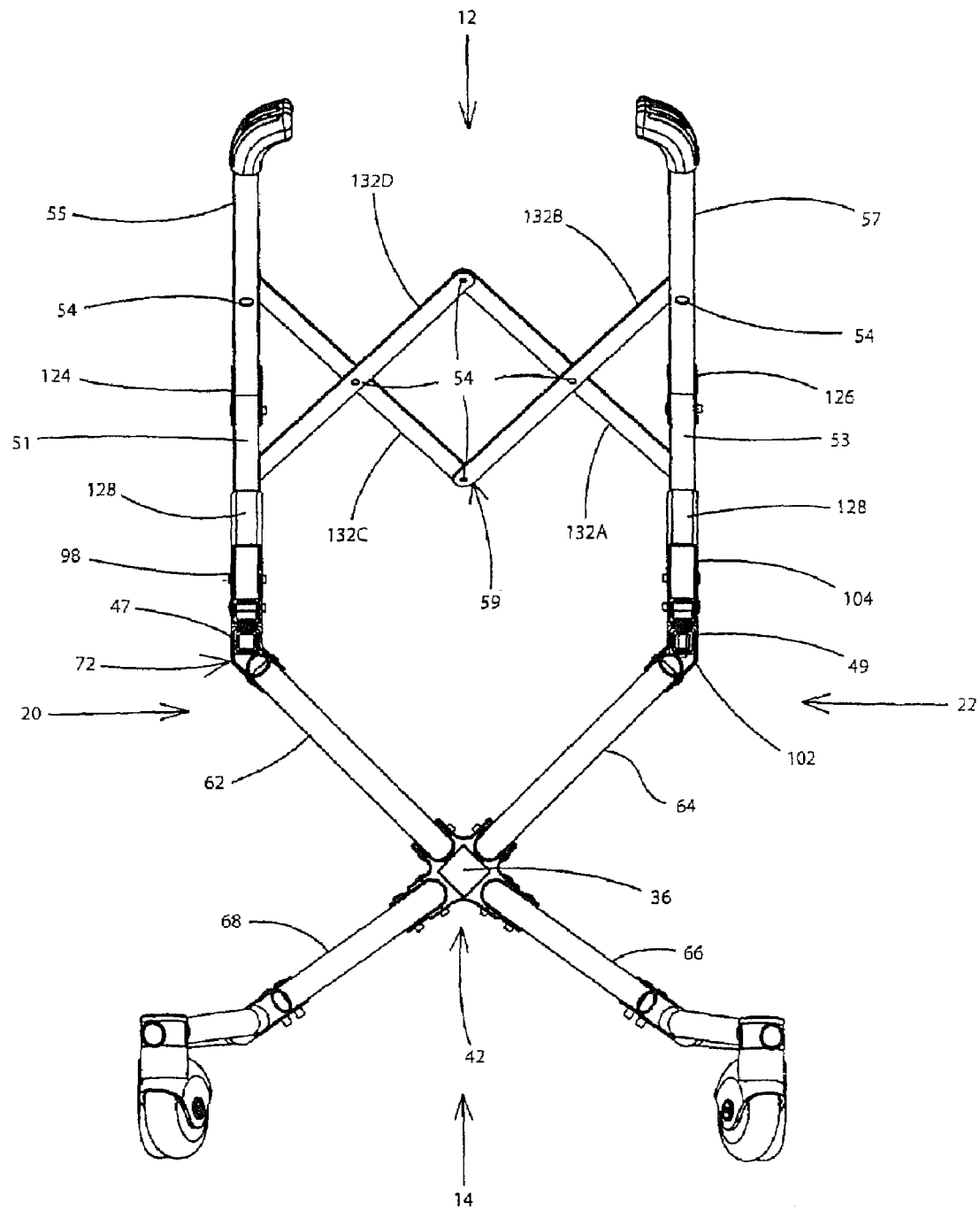
FIG. 6 is a front elevational view of the chair of FIG. 1 with the seat member, back member, foot rest and tension straps removed.

Referring to FIG. 6, pantographic assembly 59 includes four cross bars 132A-D which are pivotally connected to one another and to back poles 55 and 57 via various pivots 54. More particularly, first cross bar 132A is pivotally connected at an outer end thereof via a pivot 54 to pole 57, via a central pivot 54 to cross bar 132B and adjacent an inner end via a pivot (not shown) to an inner end of cross bar 132D. Cross bar 132B is additionally pivotally connected adjacent an outer end via a pivot 54 to pole 57 and adjacent an inner end via a pivot 54 to an inner end of cross bar 132C. Cross bar 132C is additionally pivotally connected adjacent an outer end thereof to pole 55 via a pivot 54 and to cross bar 132D at a central pivot 54 which is likewise a central pivot for cross bar 132D. Cross bar 132D is further pivotally connected to pole 55 via a pivot (not shown). The spacing between each adjacent pair of pivots 54 of assembly 59 is the same. Cross bars 132A and 132C are parallel to one another and transverse to cross bars 132B and 132D, which are likewise parallel to one another.

Thus, frame 24 includes a plurality of rigid frame members in the form of various poles which are pivotally connected to one another. Frame 24 may be thought of in terms of collapsible assemblies or sub-assemblies which are pivotally connected to one another. One of the collapsible assemblies of frame 24 includes front hub 42, struts 62, 64, 66 and 6B and the leg assemblies which include legs 31 and 35. Another collapsible assembly of frame 24 includes rear hub 44, struts 86, 88, 90 and 92, and the leg assemblies which include legs 39 and 43. Each of these collapsible assemblies is pivotally mounted to one another via the pivotal connections of the legs to spar 36 via central brackets 110 and 112. These two collapsible assemblies are also slidably connected to one another via the slidable nature of hubs 42 and 44 on spar 36. Frame 24 further includes two other primary collapsible assemblies or sub-assemblies which are in the upper portion of frame 24. Each of these assemblies includes one of the telescoping seat poles, an arm pole and a back pole. Each of these collapsible assemblies is pivotally connected to each of the lower collapsible assemblies via the pivotal connection between the respective upper struts and the telescoping seat poles.

As has been previously discussed at the individual level, each of the pivotal connections between the various members of frame 24 involves a pivotal connection about a single axis. As suggested by the discussion of various members lying in common planes, various of these axes are parallel to one another. For example, the various axes about which legs 31 and 43 are pivotally connected to struts 68 and 92 and to central bracket 110, and the pivotal connections of struts 68 and 92 with hubs 42 and 44 all are parallel to one another. Likewise, the axes about which legs 35 and 39 are pivotally connected to struts 66 and 90 and to central bracket 112, and the axes about which struts 66 and 90 are pivotally connected to hubs 42 and 44 are all parallel. Further, the axes about which struts 62 and 86 are pivotally connected to hubs 42 and 45 as well as to seat pole 47 are all parallel. Likewise, the axes about which struts 64 and 88 are pivotally connected to hubs 42 and 44 as well as to seat pole 49 are all parallel to one another. The pivotal connections of the seat poles, arm poles and back poles have already been noted to be horizontal and thus they are parallel as well and extend in the longitudinal direction. In addition, all of the axes of which cross bars 132 of assembly 59 are pivotally connected to one another and to back 55 and 57 are all parallel and extend perpendicularly to the longitudinal horizontal axes about which the seat poles, back poles and arm poles pivot. Cross bars 132 pivot about axes which are nearly horizontal in the axial direction.

The support structure of chair 10 further includes a plurality of tension straps (FIGS. 1, 2, 3 and 3A) which are mounted on frame 24. More particularly, first and second tension straps 134 and 136 are mounted on frame 24. Straps 134 and 136 (best shown as a whole in FIG. 3A) are under tension in the erected position of chair 10. More particularly, first strap 134 includes a plurality of segments each of which is substantially straight or linear when under tension. Strap 134 includes a first strap segment 138 which is connected to mount 46 of rear hub 44 via a pivot 54 adjacent a first end of strap 134. Segment 138 extends upwardly and laterally outwardly toward side 20 of frame 24 to a position adjacent the front end of first seat pole 47. Strap 134 loops over the top of first seat pole 47 forward of bracket 72 and then extends downwardly therefrom as a second strap segment 140 to mounting bracket 84 through which it passes via a pair of slots 141 formed in bracket 84. Strap 134 thus loops through slots 141 and extends as a third strap segment 142 extending from bracket 84 to bracket 82 where strap 134 passes through a pair of slots 141 formed in bracket 82. Strap 134 then continues as a fourth strap segment 144 which extends upwardly from bracket 82 to second seat pole 49 adjacent the front end thereof in front of bracket 78. Strap 134 continues as a fifth strap segment 146 which extends from bracket 78 downwardly, rearwardly and laterally inward away from side 22 to mount 48 of rear hub 44, where strap 134 is attached adjacent its second end to the pivot 45 of mount 48.

Each of segments 138 and 146 serve to connect the forward collapsible assembly which includes hub 42 with the rear collapsible assembly which includes hub 44. Strap segments 140, 142 and 144 form a U-shaped configuration wherein segment 142 serves as a base with segments 140 and 144 extending upwardly therefrom. In addition, strap segments 138 and 146 in conjunction with an upper portion of hub 44 have a V-shaped configuration with hub 44 being at the point of the V. When viewed in the axial direction, the V configuration opens upwardly and when viewed in the vertical direction, the V opens in the forward direction.

Figure 3A:
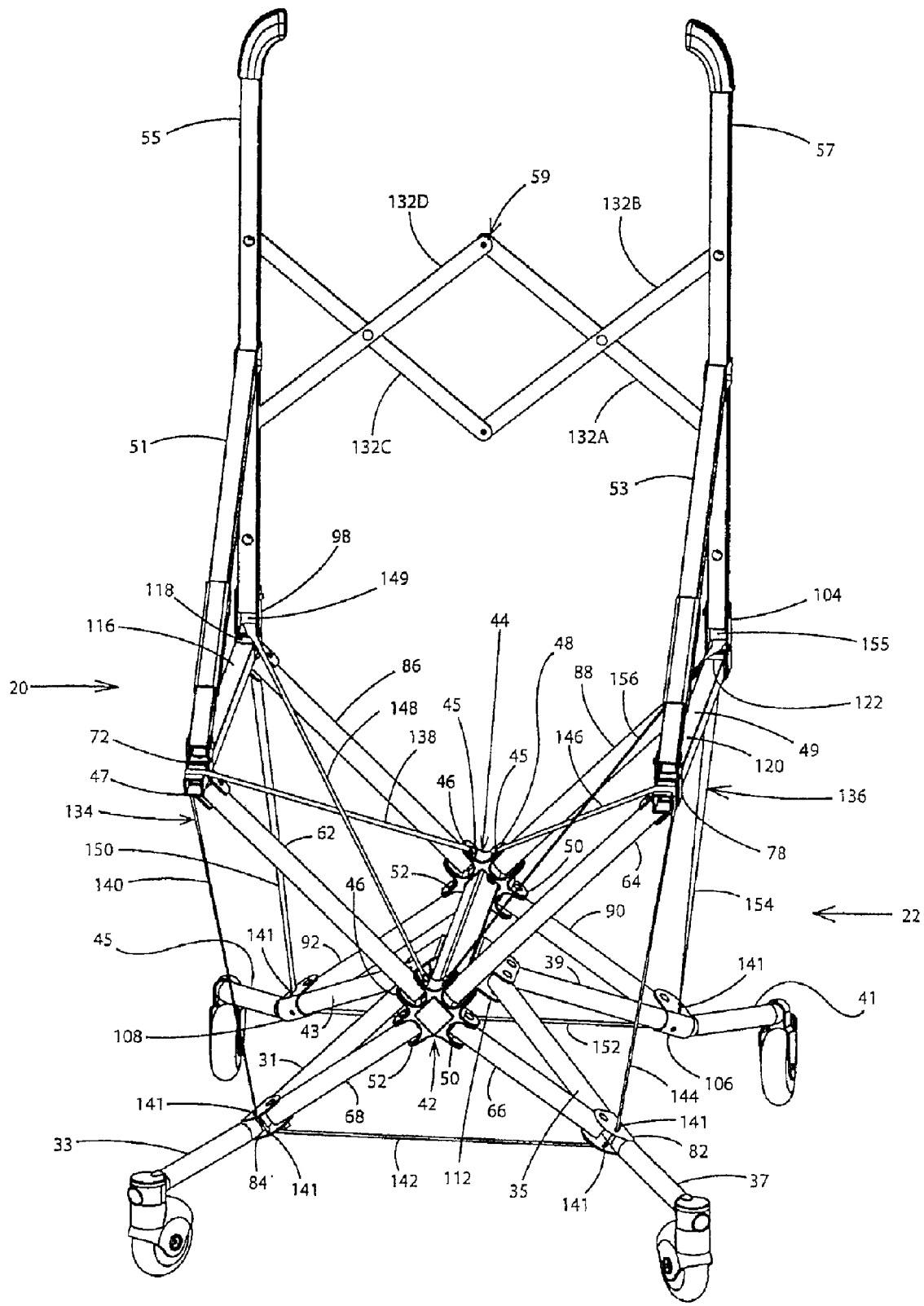
FIG. 3A is a perspective view of the chair of FIG. 1 from a more frontal angle with the seat member, back member and foot rest removed.
Figure 4:
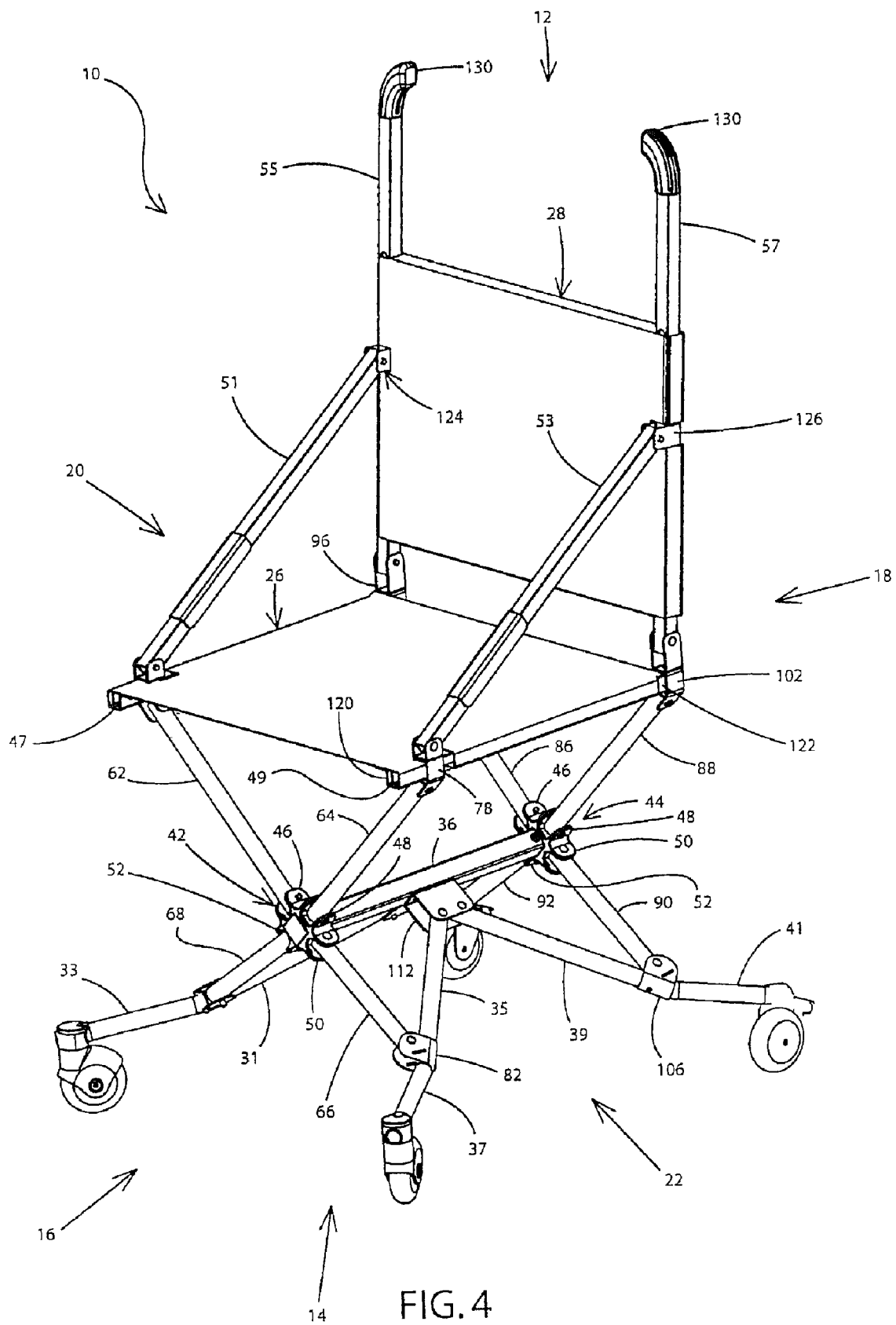
FIG. 4 is a perspective view similar to FIG. 1 that shows the chair with the tension straps removed.

With continued reference to FIG. 3A, second tension strap 136 is configured similar to strap 134 in reverse and is nearly a mirror image of strap 134 when chair 10 is in the erected position. Second strap 136 includes a first strap segment 148 which is connected adjacent a first end of strap 136 to mount 46 of front hub 42 via a pivot 54. Segment 148 extends from mount 46 upwardly, rearwardly and laterally outwardly toward side 20 to loop over a portion of second leg segment 118 of first seat pole 47. More particularly, strap 136 extends through a passage 149 defined by upper mount 98 between a pair of projections thereof and the lower end of first back pole 55. Strap 36 then passes directly behind leg segment 118 and continues as a second strap segment 150 extending from second leg segment 118 of pole 47 downwardly to bracket 108 and passes through slots 141 (lower slot shown in FIG. 5) formed in bracket 108. Second strap 136 then continues horizontally as a third strap segment 152 (FIG. 3) extending from bracket 108 to bracket 106. Strap 36 passes through slots 141 (lower slot in FIG. 5) formed in bracket 106 and then extends upwardly therefrom as a fourth strap segment 154 passing directly behind and over a portion of second leg segment 122 adjacent the rear end thereof. More particularly, strap 136 passes through a passage 155 defined by upper mount 104 between a pair of projections thereof and the lower end of second back pole 57. Strap 136 then continues from passage 155 as a fifth strap segment 156 (FIGS. 1, 2 and 3A). Segment 156 extends from passage 155 downwardly, forwardly and laterally inwardly away from side 22 to connect to mount 48 of front hub 42 via a pivot 54 adjacent a second end of strap 136.

Straps 148 and 156 serve to connect the forward collapsible assembly which includes hub 42 with the rear collapsible assembly which includes hub 44. Straps 150, 152 and 154 form a U-shaped configuration with segment 152 being a base with segments 150 and 154 extending upwardly therefrom. In addition, strap segments 148 and 156 in conjunction with an upper portion of hub 42 form a V-shaped configuration with hub 42 serving as the point thereof. In the axial direction, the point of the V is a lower end as the V opens upwardly. Viewed in the vertical direction, the point of the V is at the front as the V opens rearwardly. Segment 148 of second strap 136 crosses segment 138 of first strap 134 to form an X-shaped configuration with segment 148 in abutment or closely adjacent segment 138. Likewise, segment 156 crosses segment 146 to form an X-shaped configuration with segment 156 in abutment with or closely adjacent segment 146. The various strap segments of tension straps 134 and 136 thus provide tension between the respective locations of frame 24 between which each strap segment extends as it winds around frame 24. Thus, for instance, strap segment 140 provides tension between the front end of first seat pole 47 and each of leg 31 and strut 68 via bracket 84. Segment 140 thus is applying a downward force along the vector represented by segment 140 on the front end of pole 47 and the front end of arm pole 51, and an opposing upward force on bracket 84 and thus also leg 31 and strut 68. Likewise, segment 142 applies a horizontal force on each of brackets 84 and 82 toward one another, which applies to the corresponding frame members connected thereto. It will be readily understood by one skilled in the art that each of the strap segments provides a corresponding tension and forces on the members between which extends and that each strap segment represents a vector along which the force is applied. It is further noted that each of the strap segments may be replaced with a single individual strap or that any number of the segments may be a single strap. However, the use of two straps to provide the described configuration simplifies the construction of chair 10.

The support structure of chair 10 provides substantial structural integrity via the use of triangular configurations throughout the structure. These triangular configurations are discussed with reference to three zones of support structure of chair 10. More particularly, chair 10 has a first lower zone which extends from spar 36 downwardly, a second intermediate zone which extends from spar 36 upwardly to seat poles 47 and 49 and a third upper zone which extends upwardly from seat poles 47 and 49. Most desirably, the greatest structural integrity will be provided by triangular structures or diagonal bracing in each of these zones when viewed in each of the axial direction, longitudinal direction and vertical direction.

Thus, for instance, when in viewed in the axial direction, struts 66 and 68 in combination with strap segment 142 provide a triangular structure in the lower zone, a similar structure being provided at the rear via struts 90 and 92 and strap segment 152. As viewed in the axial direction within the second zone, several triangular structures are formed with seat member 26. For example, seat member 26 in conjunction with struts 62 and 64 form a triangle as do seat member 26 and struts 86 and 88. Also, strap segments 138 and 146 with seat member 26 form a triangle and strap segments 148 and 156 with seat member 26 form a triangle. In the upper zone viewed in the axial direction, pantographic assembly 59 provides a triangle formed of respective portions of cross bars 132C and D with first seat pole 55 and also with portions of cross bars 132A and B with back pole 57.

Viewed in the longitudinal direction (FIG. 2), the front portion of spar 36 with strut 66 and leg 35 forms a triangle, as do the rear portion of spar 36 with strut 90 and leg 39. In the second or intermediate zone, triangles are formed via the crossing of strap segments 146 and 156 with any of seat member 26, strut 64, spar 36 and strut 88. Similar triangular structures are formed via the crossing of strap segments 138 and 148 with corresponding rigid members. In the upper zone viewed in the longitudinal direction, each back pole, arm pole and seat pole forms a triangular configuration.

Viewed in the vertical direction, there are various triangles formed in the lower zone. For example, leg 35, strut 66 and the front portion of spar 36 form a triangle. Likewise, in the rear collapsible assembly, leg 39, strut 90 and the rear portion of spar 36 form a triangle. In addition, legs 31 and 35 and strap segment 142 also form a triangle. In the intermediate zone in the vertical direction, the crossing of strap segments 138 and 148 in conjunction with any of spar 36, struts 62 and 86 and seat pole 47 will form a triangle. The crossing of strap segments 146 and 156 provide similar triangular structures in the vertical direction within the intermediate zone. These multiple triangular structures throughout the support structure of chair 10 provide substantial integrity to the chair.

Figure 9:
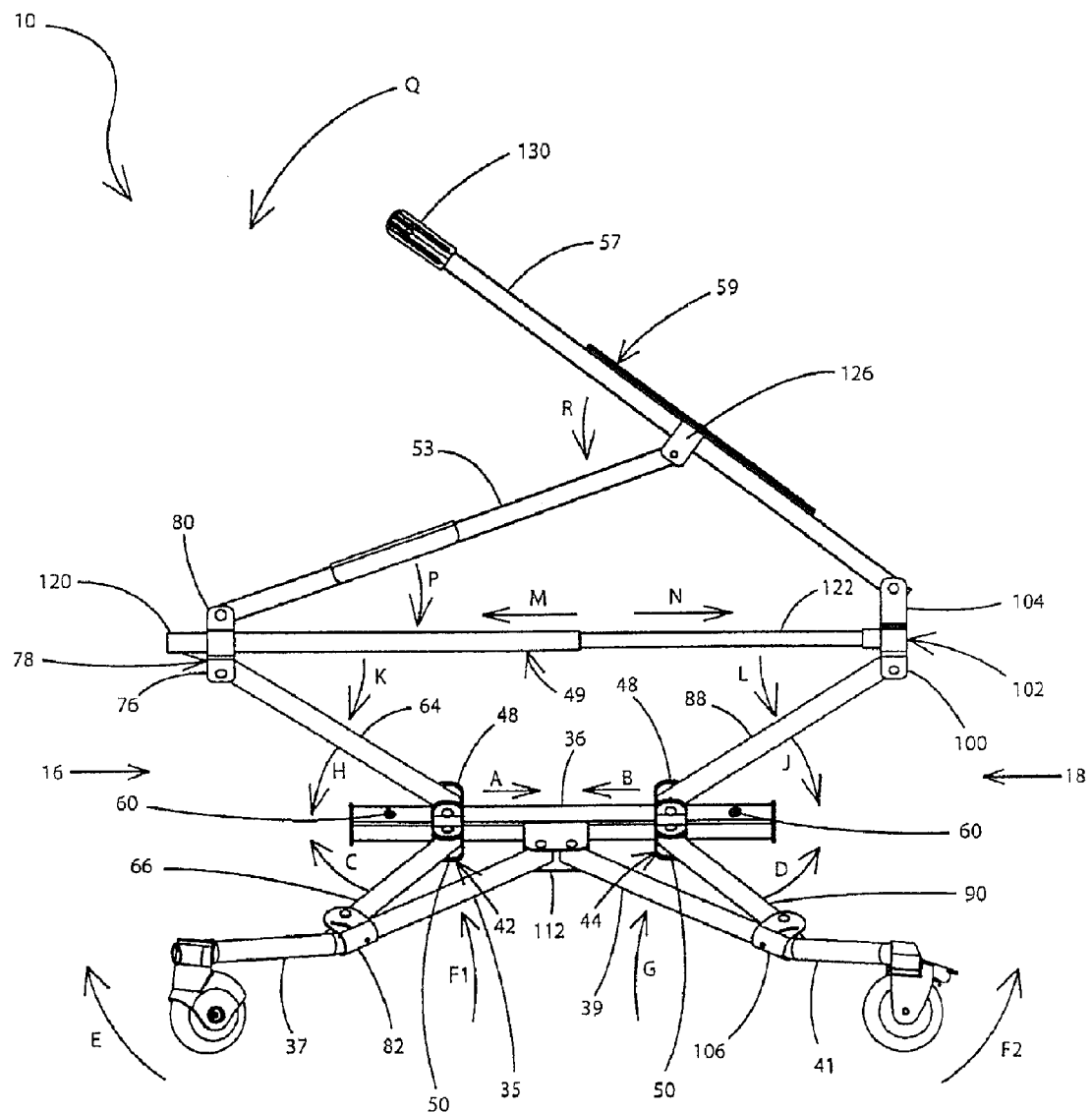
FIG. 9 is a side elevational view showing the initial stage of collapse of FIGS. 7 and 8.
Figure 10:
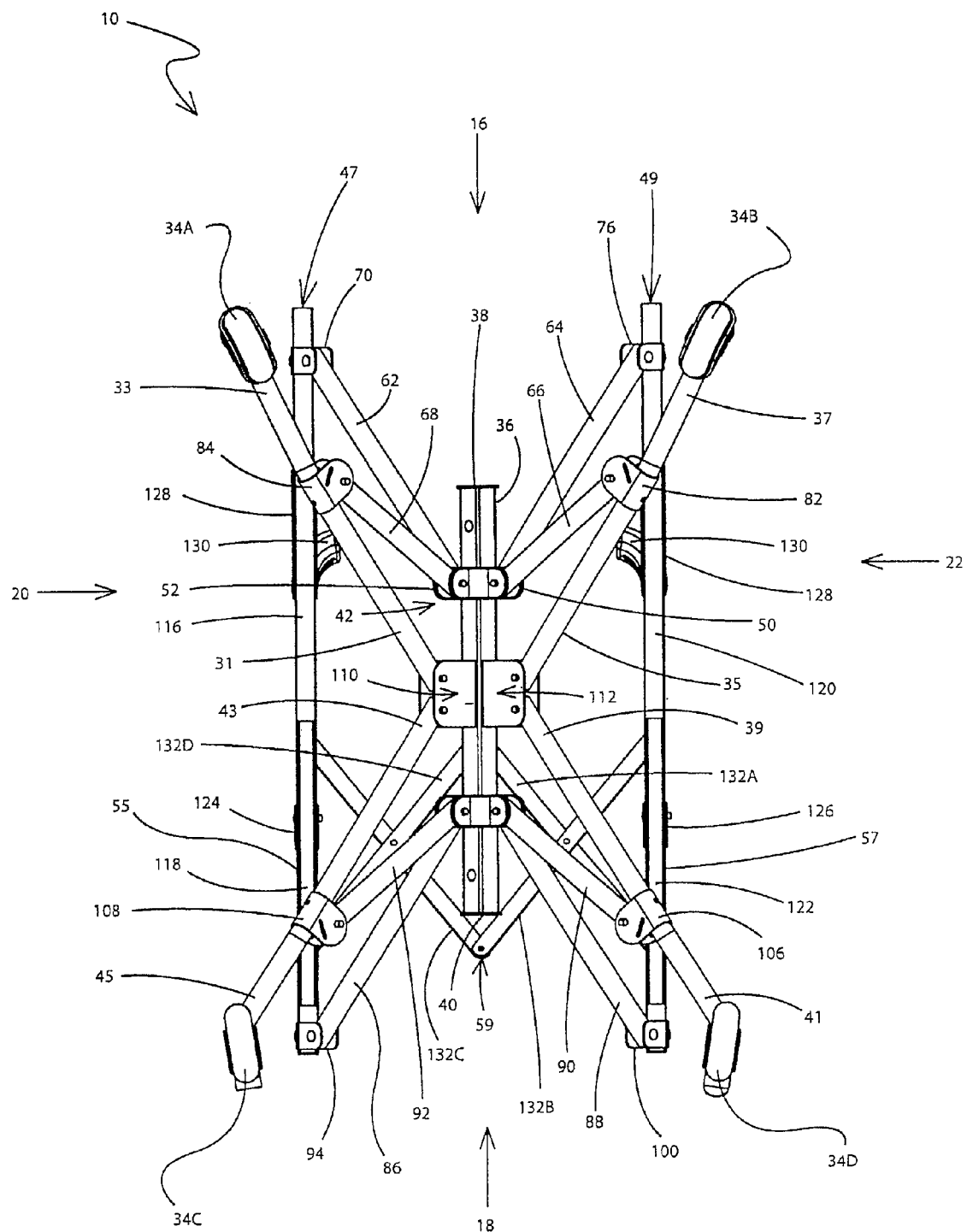
FIG. 10 is a bottom plan view showing the initial stage of collapse of FIGS. 7-9.

The collapsing operation of chair 10 is now described with reference to FIGS. 7-12. An initial stage of collapse is shown in FIGS. 7-10. Referring to FIG. 9, to initiate the collapse of chair 10, buttons 60 are depressed to allow hubs 42 and 44 to move inwardly toward one another. More particularly, hub 42 and the inner ends of struts 62, 64, 66 and 68 move horizontally rearwardly as indicated at arrow A. Hub 44 and the inner ends of struts 86, 88, 90 and 92 move horizontally forward as indicated at arrow B. The movement of hub 42 as indicated thus causes the forward struts to move from a coplanar orientation (FIG. 2) to form intersections of the triangular sides of a four-sided pyramid, as best seen in FIG. 8. Likewise, the forward movement of hub 44 causes the rear struts to move to a coplanar orientation (FIG. 2) to form the intersections of a four-sided pyramid. The sliding movement of hubs 42 and 44 causes all of the frame members to simultaneously pivot about their respective pivotal connections from the erected position to the collapsed position. Once a certain degree of collapse has been achieved, the remainder of the collapsing procedure will occur solely by force of gravity. The pivotal movements described below are related to spar 36, or other members where specified.

More particularly, the sliding movement of hubs 42 and 44 shown in FIG. 9 causes the front outer end of strut 66 to pivot via its pivotal connection at hub 42 radially inwardly and upwardly toward spar 36 (arrow C) while lower rear strut 90 pivots in the same manner about its pivotal connection on hub 44 (arrow D) although struts 66 and 90 pivot in opposite directions and thus the rear outer end of strut 90 pivots inwardly and upwardly toward spar 36. The pivotal movement of strut 66 pulls leg 35 along with it so that leg 35 pivots about its pivotal connection at central bracket 112 radially inwardly toward spar 36 as indicated at arrow E. Leg 35 also pivots relative to strut 66 about bracket 82 as indicated at arrow F1. Likewise, the pivotal movement of rear strut 90 causes leg 39 to pivot about its pivotal connection at bracket 112 radially inwardly as indicated at arrow F2 toward strut 36. Leg 39 also pivots relative to strut 90 about its pivotal connection at bracket 106 as indicated at arrow G. Struts 66 and 90, legs 35 and 39 and spar 36 at all times lie in a common first plane (represented by Arrow S1 in FIG. 7) which has an incline of roughly 45° and extends upwardly and laterally inwardly from side 22 to spar 36. Thus, these structural members lie in the first plane when in the erected position, the collapsed position and during all pivotal movement between said positions.

The movement of hubs 42 and 44 toward one another also causes the front end of upper front strut 64 to pivot about its pivotal connection at mount 48 downwardly and laterally inwardly from adjacent side 22 toward spar 36 as indicated at arrow H in FIG. 9. In mirror image fashion, the rear end of strut 88 likewise pivots downwardly and laterally inwardly from side 22 toward strut 36 as indicated at arrow J. The downward pivotal movement of struts 64 and 88 carries seat pole 49 therewith so that pole 49 moves downwardly and laterally inwardly from side 22 toward spar 36 and pivots about its pivotal connection at mount 76 as indicated at arrow K and about its pivotal connection at mount 100 as indicated at arrow L in FIG. 9. Struts 64 and 88 and seat pole 49 all lie in a common second plane (represented at arrow T1 in FIG. 7) which also has an incline of roughly 45° and intersects the first plane roughly perpendicularly. During the pivotal movement of struts 64 and 68 and pole 49, the front end of strut 64 and the rear end of strut 88 move away from one another, causing first and second leg segments 120 and 122 of pole 49 to slide linearly relative to one another to extend pole 49 in the axial direction. More particularly, first leg segment 120 moves horizontally forward (arrow M) relative to spar 36 and second leg segment 122 horizontally rearward (arrow N) relative to spar 36 so that the front and rear ends of seat pole 49 move away from one another.

Meanwhile, arm pole 53 pivots downwardly about its pivotal connection at mount 80 as indicated at arrow P in FIG. 9, said pivotal movement being in a vertical plane relative to seat pole 49. Back pole 57 also pivots downwardly about its pivotal connection at mount 104 as indicated at arrow Q vertically relative to seat pole 49. Back pole 57 also pivots about its pivotal connection at mount 126 relative to arm pole 53 as indicated at arrow R. Seat pole 49, arm pole 53 and back pole 57 lie in a substantially vertical third common plane (represented by arrow U1 in FIG. 7) which is thus roughly at a 45° angle with each of the first and second planes (arrows S1 and T1 in FIG. 7).

Figure 7:
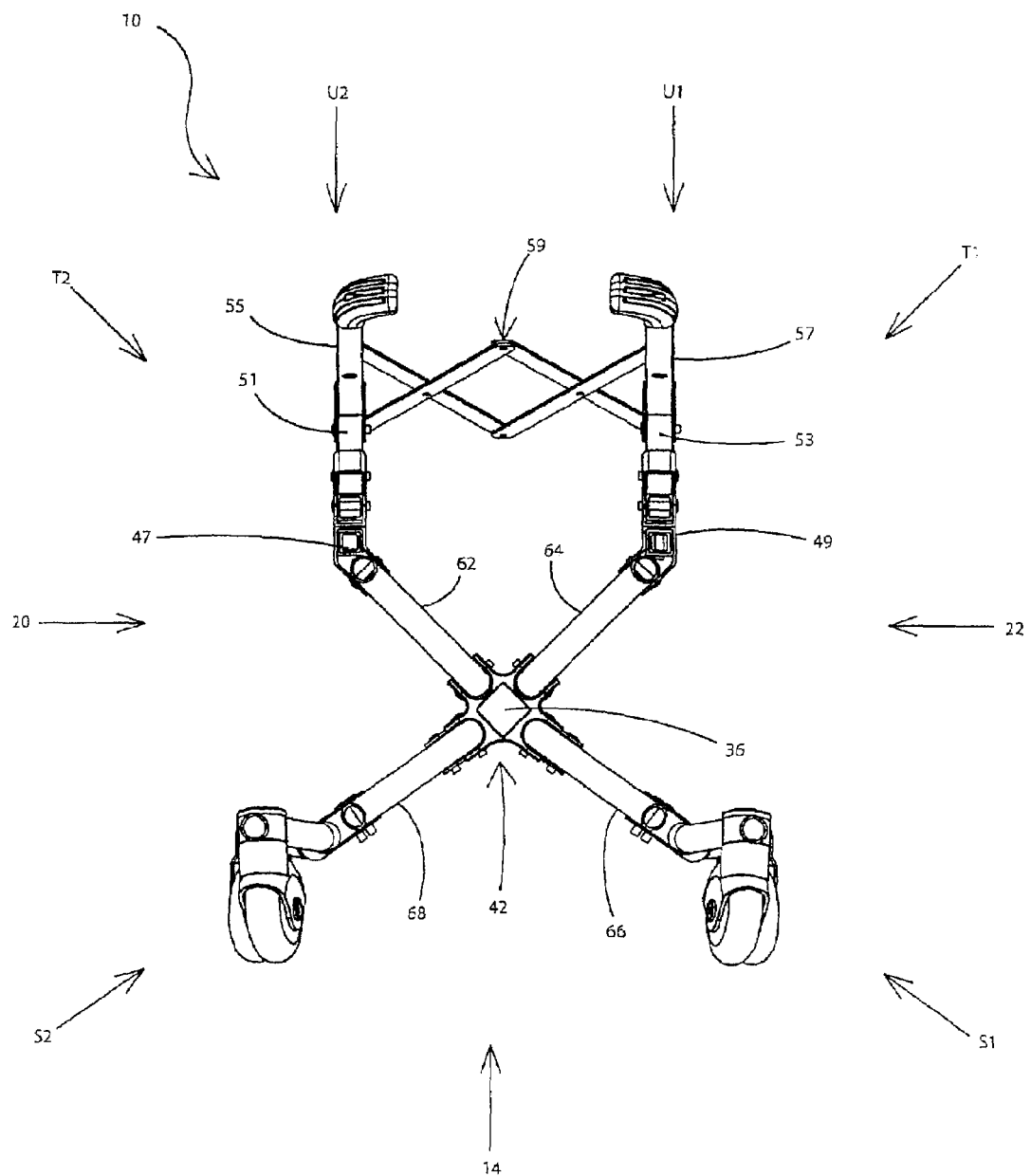
FIG. 7 is similar to FIG. 6 and shows an initial stage of collapse of the chair of FIG. 1.

Chair 10 is bilaterally symmetrical relative to a vertical plane which passes centrally through spar 36 in the axial direction. Thus, the movement of the lower spars and the legs on second side 20 is the same as the movement of the lower struts and legs 22 except in a mirror image fashion. The movement of the lower struts and legs on side 22 is indicated in FIG. 7 at arrow S1, which also represents the first common plane. Likewise, the lower struts and legs on first side 20 is represented at arrow S2, which also represents a common plane in which the lower struts and legs on first side 20 lie. FIG. 7 also shows the movement of upper struts 64 and 88 and seat pole 49 at arrow T1, which also represents the second common plane. Upper struts 62 and 86 and seat 47 move in the same manner as their corresponding counterparts on right side 22 except for in mirror image fashion, and this movement is thus represented at arrow T2, which also represents a common plane in which these members lie. FIG. 7 also represents the vertically downward movement of handle 57 and arm pole 53 at arrow U1, which also represents the third common plane. Likewise, FIG. 7 represents a corresponding vertically downward movement of corresponding poles 51 and 55 at arrow U2, which also represents a common plane in which poles 47, 51 and 55 lie. FIG. 7 also shows the retraction of pantographic assembly 59 so that assembly 59 is shortened in the longitudinal direction as back poles 55 and 57 move toward one another in the longitudinal direction. Assembly 59 pivots about the various pivots 54 thereof in a standard manner well known in the art.

Figure 11:
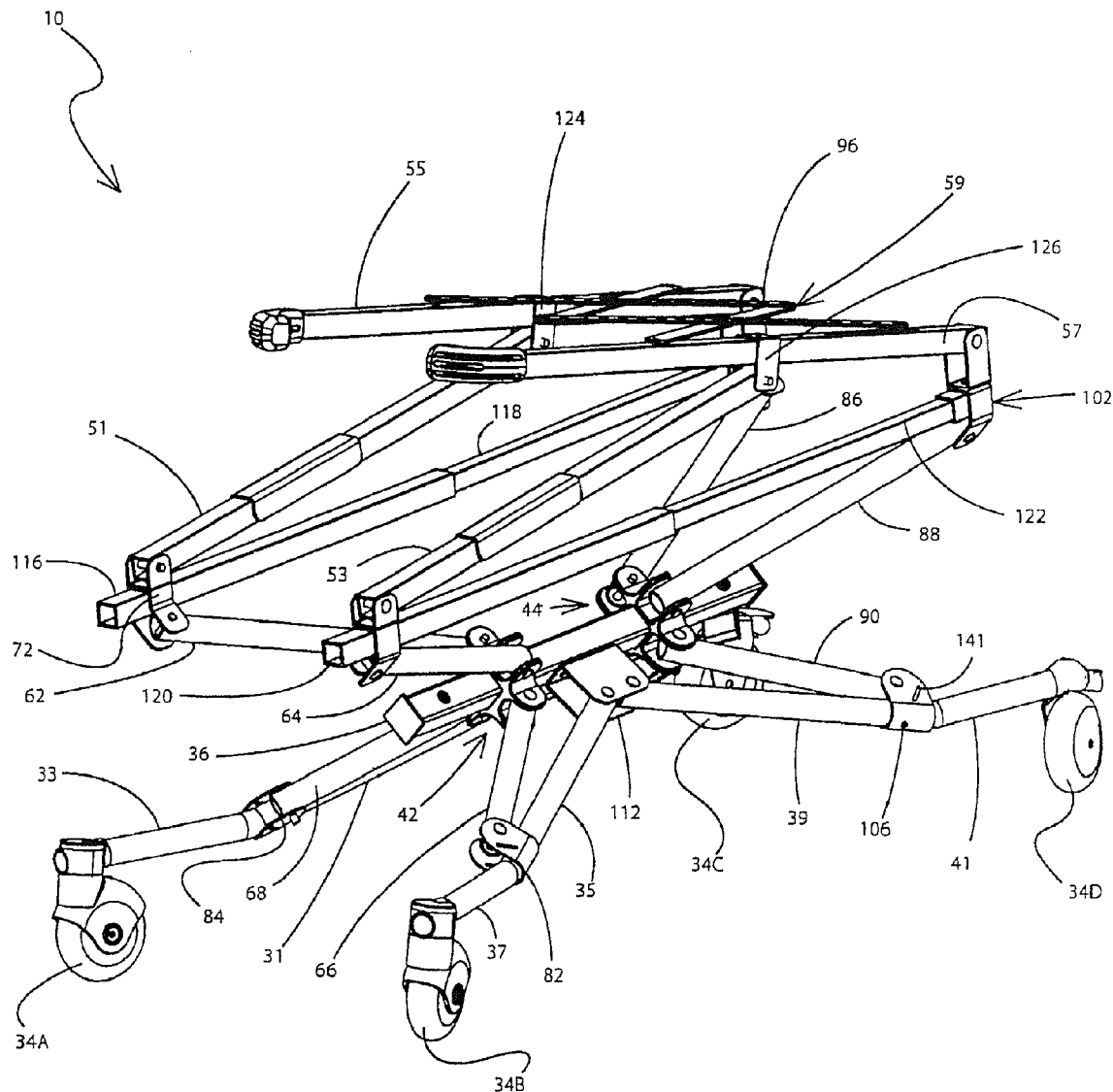
FIG. 11 is a perspective view showing a further stage of collapse of the chair of FIG. 1.
Figure 12:
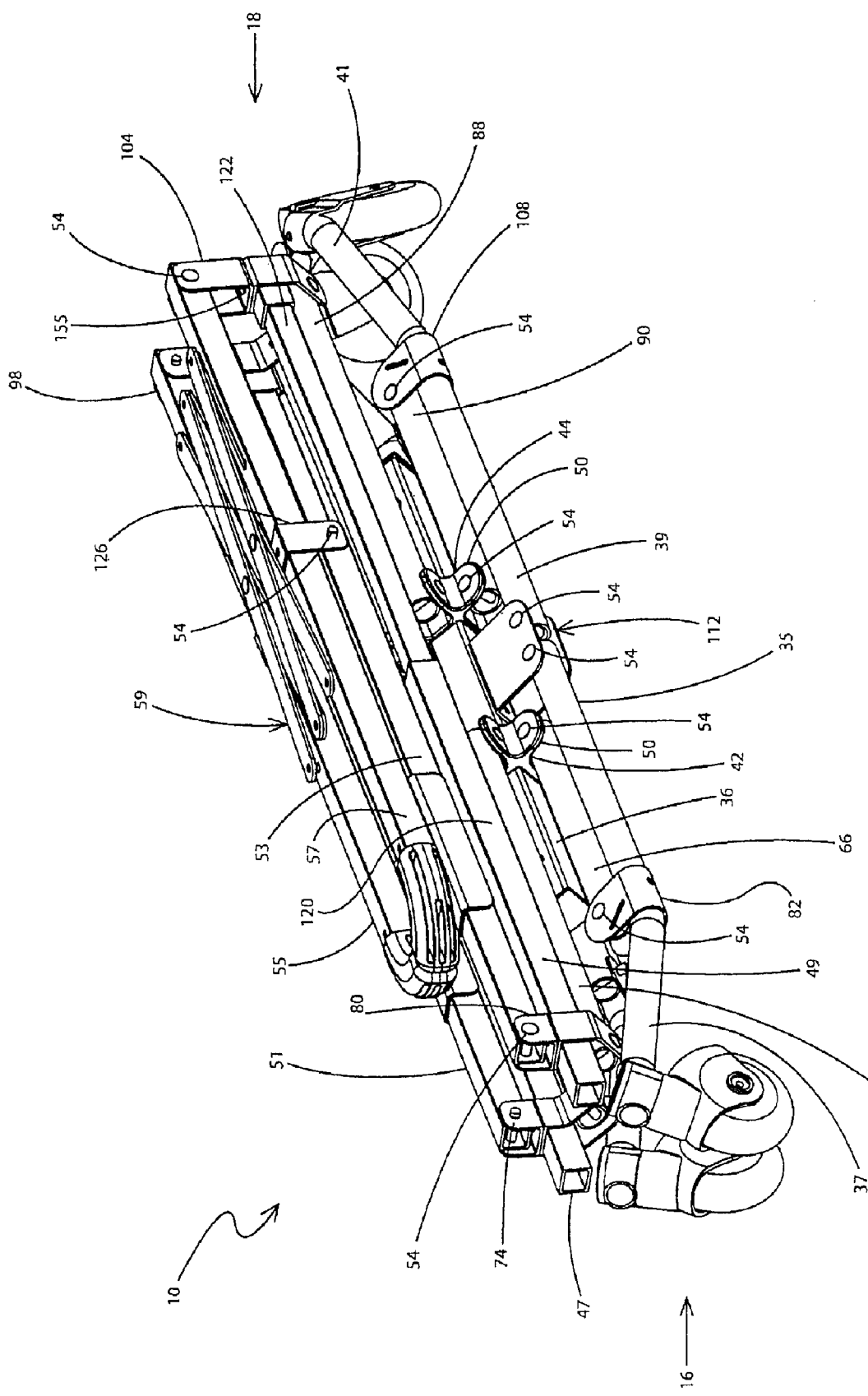
FIG. 12 is a perspective view of the chair of FIG. 1 in its collapsed position.
Figure 13:
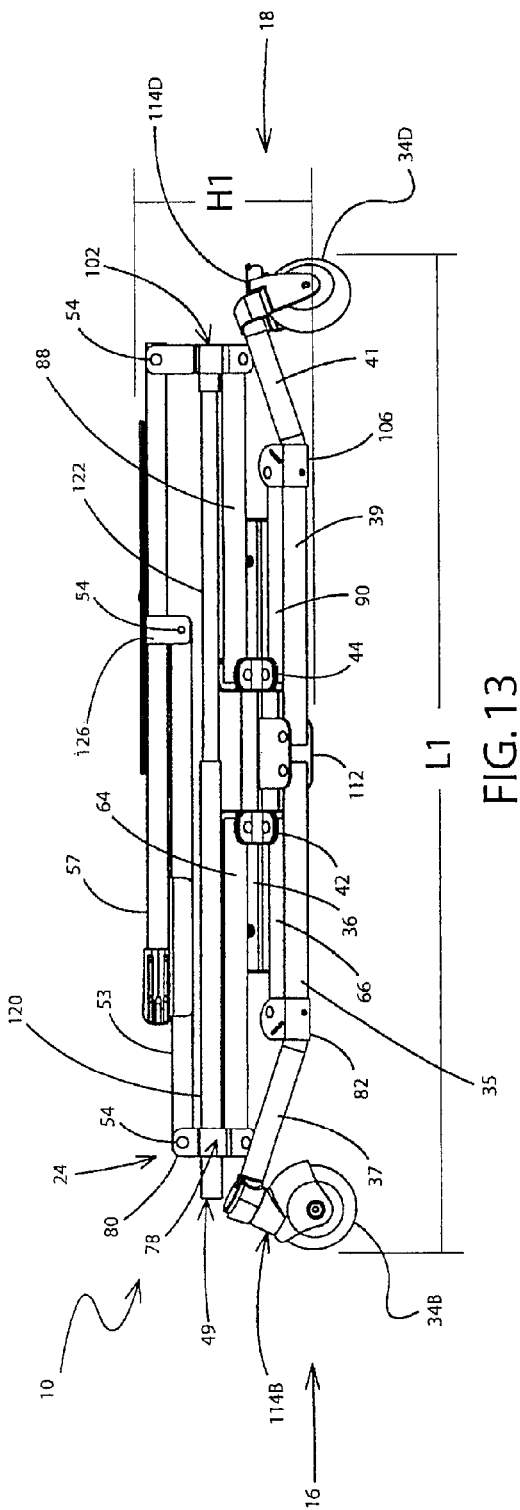
FIG. 13 is a side elevational view of the chair of FIG. 1 in its collapsed position.

FIGS. 7-10 all show chair 10 at about 50% of the movement from the erected position toward the collapsed position. The various members of frame 24 continue to move in the same fashion toward the collapsed position. FIG. 11 shows chair 10 about 75% collapsed. FIGS. 12-15 show chair 10 in the collapsed position. In the collapsed position, nearly all of the poles or elongated members are parallel to one another. However, feet 33, 37, 41 and 45 are all angled somewhat relative to the parallel direction of the poles. As shown in FIGS. 12 and 13, the upward angle of the feet in the collapsed position serves to accommodate wheels 34 in a more compact configuration, more particularly reducing the height of chair 10 in the collapsed configuration.

More particularly, the members of frame 24 which are parallel to one another in the collapsed position are spar 36, all of the legs, all of the struts, both of the seat poles, both of the arm poles and both of the back poles. The various pivots connecting these poles are positioned in a specific manner in order to achieve this parallel configuration. For example, as best seen in FIG. 13, the pivot 54 of mount 104 is spaced upwardly from the top of seat pole 49 further than is the pivot 54 of upper mount 80. This arrangement allows arm pole 53 to lie atop seat pole 49 and back pole 57 to lay atop arm pole 53 in a parallel configuration. In addition, the pivot 54 of bracket 126 is positioned to allow for this parallel configuration. Arm pole 53 in the collapsed position is aligned with passage 155 of bracket 104 (FIG. 12). The same is true of the corresponding poles on first side 20 so that, for example, the pivot of mount 98 is disposed upwardly further from seat pole 47 than is the pivot of mount 74 and so forth.

Similarly, and with reference to FIG. 12, the forward and rearward pivots 54 of central mounting bracket 112 are spaced outwardly from a side of spar 36 further than are each of the respective pivots 54 of mounts 50 of hubs 42 and 44. The pivots 54 of each mount 50 and the pivots 54 of brackets 82 and 106 are appropriately aligned to provide for the parallel configuration. Thus, lower forward strut 66 is disposed between leg 35 and the forward portion of spar 36 and is closely adjacent or abuts each of leg 35 and spar 36. Likewise, lower rear strut 90 is disposed between leg 39 and the rear portion of spar 36, either closely adjacent or in abutting relation with leg 39 and spar 36. Central mounting bracket 110 is configured in the same manner as bracket 112 so that the legs and lower struts adjacent side 20 of frame 24 are likewise positioned in a mirror image of those on second side 20. As seen in FIGS. 12 and 13, upper front strut 64 is disposed between leg segment 120 of seat pole 49 and the front portion of main spar 36, closely adjacent or in abutting relation with segment 120 and spar 36. Likewise, upper rear strut 88 is disposed between leg segment 122 of seat pole 49 and the rear portion of main spar 36, closely adjacent or abutment with segment 122 and spar 36. The corresponding upper rear strut and leg segment adjacent side 20 has a mirror image configuration to strut 88, leg segment 118 and spar 36 and a corresponding relationships.

Figure 14:
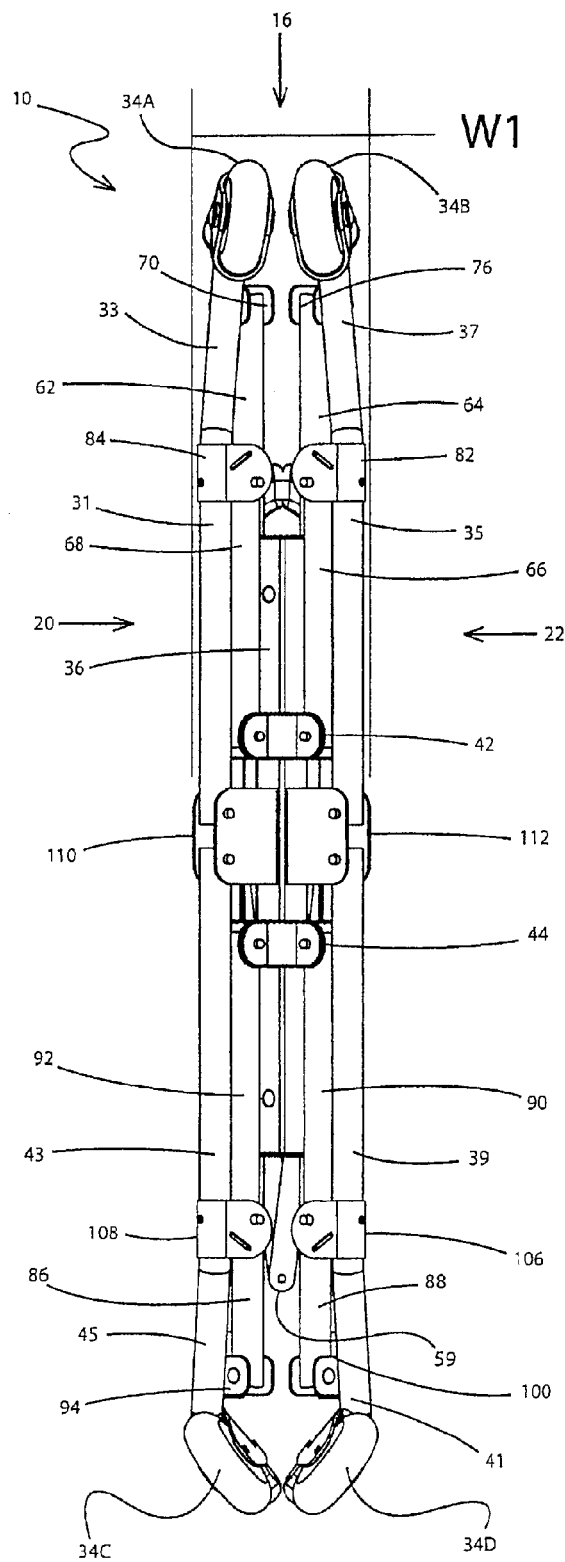
FIG. 14 is a bottom plan view of the chair of FIG. 1 in its collapsed position.

As shown in FIG. 13, frame 24 in the collapsed position has a height H1 from the top to the bottom of the frame which excludes wheels 34 and castor assemblies 114. It is noted, however, that assemblies 114 are substantially disposed above the bottom of frame 24 and that a little over half of wheels 34 are as well. FIG. 13 also shows a total length L1 of chair 10 which includes the entire structure. FIG. 14 shows a width W1 of frame 24 in the collapsed position wherein only a very small portion of wheels 34C and 34D extend laterally outwardly from the frame and wheels 34A and 34B are disposed laterally inwardly of the sides of frame 24. As is clear from the figures, height H1 of frame 24 in the collapsed position is substantially less than the height of the frame in the erected position. Likewise, width W1 in the collapsed position is substantially less than the width of the frame in the erected position. In contrast, length L1 is substantially greater than the length of chair 10 in the erected position. Height H1, length L1 and width W1 may vary, but most desirably are kept to a minimum. Preferably, height H1 is no greater than 8.0 inches, length L1 is no greater than 36.0 inches and width W1 is no greater than 6.5 inches. One preferred embodiment of chair 10 in which chair 10 is suitable for the seating of an individual weighing 300 pounds or more on seat member 26, height H1 is no greater than 6.0 inches, length L1 is no greater than 34.0 inches and width WI is no greater than 4.5 inches. Thus, chair 10 in the collapsed position provides a very compact structure which is easily stored in relatively small spaces such as overhead compartments in most commercial airplanes.

Figure 16:
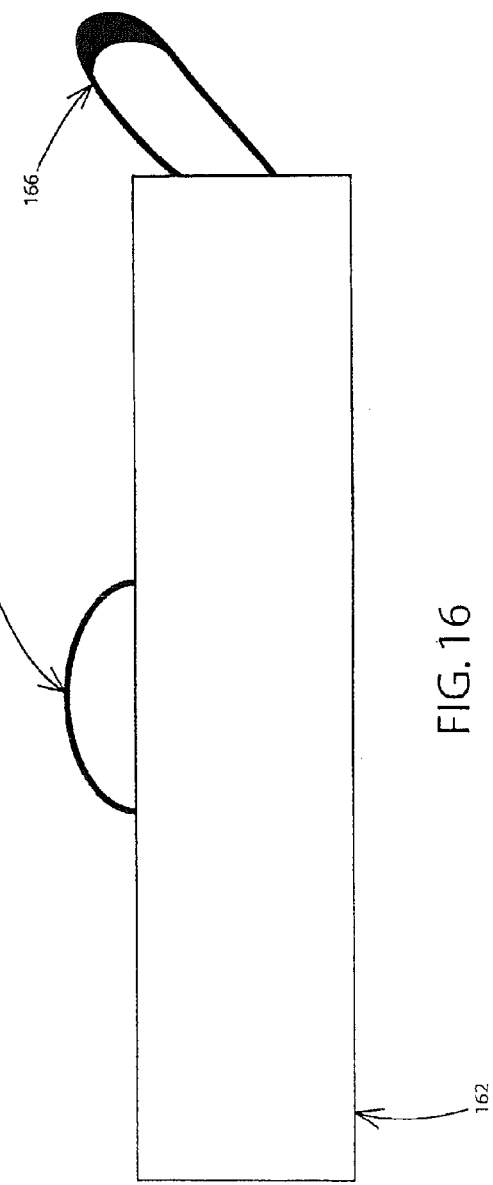
FIG. 16 is a diagrammatic side elevational view of a carry bag in which the chair of FIG. 1 may be contained when in its collapsed position.
Figure 15:
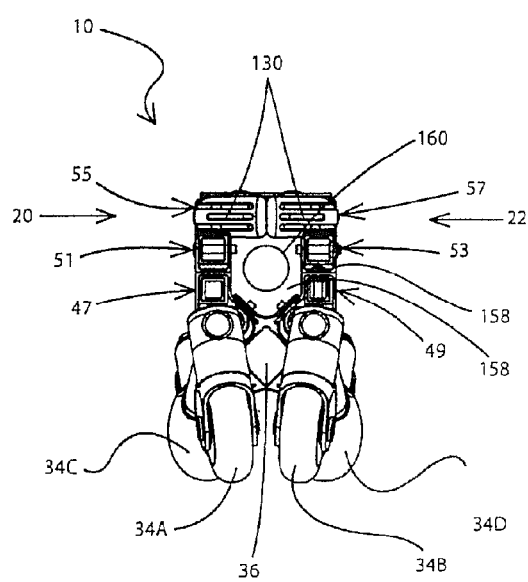
FIG. 15 is a front elevational view of the chair of FIG. 1 in its collapsed position.

FIG. 15 shows a vertical wall on first side 20 formed by the stacking of back pole 55, arm pole 51 and seat pole 47. FIG. 15 also shows a vertical wall on right side 22 formed by the stacking of back pole 57, arm pole 53 and seat pole 49. These two vertical walls define therebetween a space 158 in which various flexible material 160 of chair 10 is disposed in the collapsed configuration. Material 160 includes portions of straps 134 and 136, collapsible seat member 26 and front panel 30 of collapsible back member 28. Material 160 is shown diagrammatically in FIG. 15 due to the difficulty of showing such flexible materials in their folded or otherwise convoluted collapsed configurations. It will be appreciated that material 160 may include rear panel 32 where panel 32 is removably mounted on frame 24 and insertable into space 158. Alternately, rear panel 32 may simply be folded around the exterior of frame 24 when in the collapsed position. To make transportation of chair 10 in its collapsed configuration easier, chair 10 may be disposed in a carrying bag 162 (FIG. 16) which has dimensions only slightly larger than those of chair 10 in the collapsed position. Bag 162 may include a handle 164 and a shoulder strap 166 for carrying over the shoulder.

Figure 17:
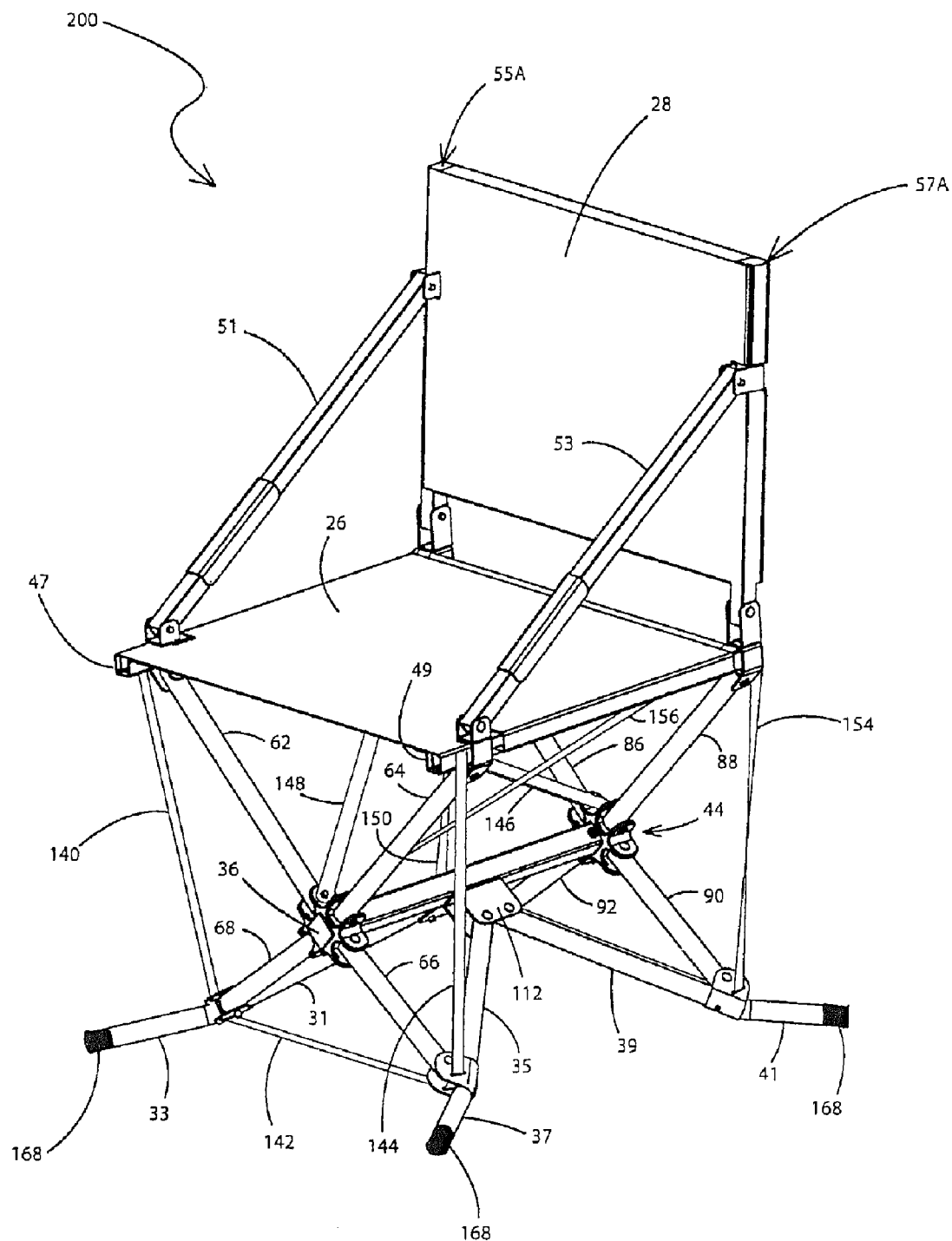
FIG. 17 is a perspective view of a chair in accordance with an alternate embodiment of the present invention.

FIG. 17 shows chair 200 according to an alternate embodiment of the present invention, which is similar to chair 10 except that chair 200 does not include wheels and related mounting assemblies, eliminates the foot rest, and reduces the height of the back by using back poles 55A and 57A in place of poles 55 and 57 whereby handles 130 are also eliminated. Particularly, wheels 34 and assemblies 114 are replaced by end caps 168 which are configured for contacting the ground or other supporting surface. Caps 168 are typically formed of plastic or a polymeric material. All other aspects of chair 200 are the same as chair 10 and thus chair 200 operates in the same fashion as chair 10.

Referring to FIGS. 13-30, a chair according to another alternate embodiment of the present invention is generally shown at 300. The chair 300 is in many respects similar to the chair 10 of FIGS. 1-15, and as such similar elements in both chairs are indicated by the same reference numerals and will not be further described herein.

Figure 20:
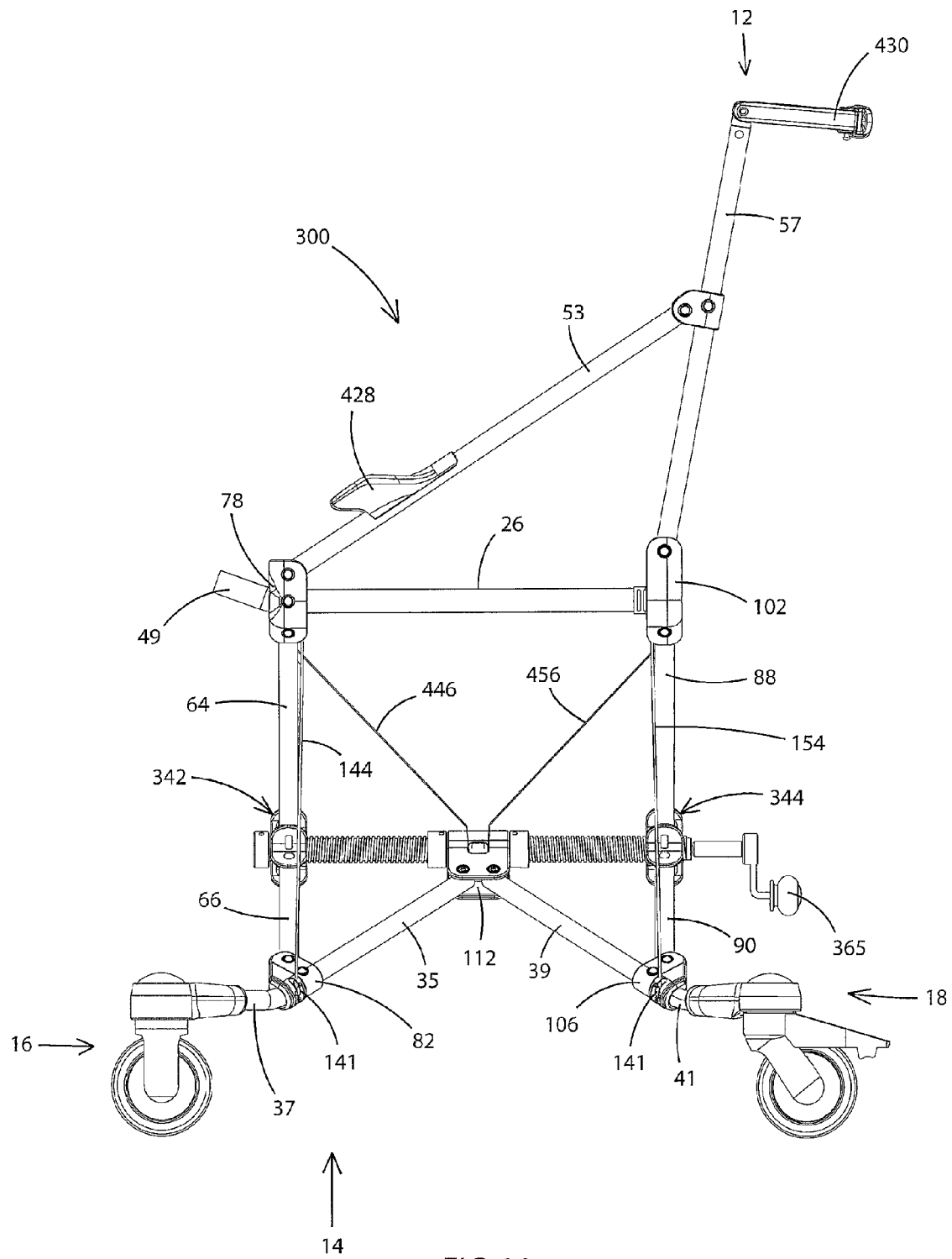
FIG. 20 is a side elevational view of the chair of FIG. 18.
Figure 21:
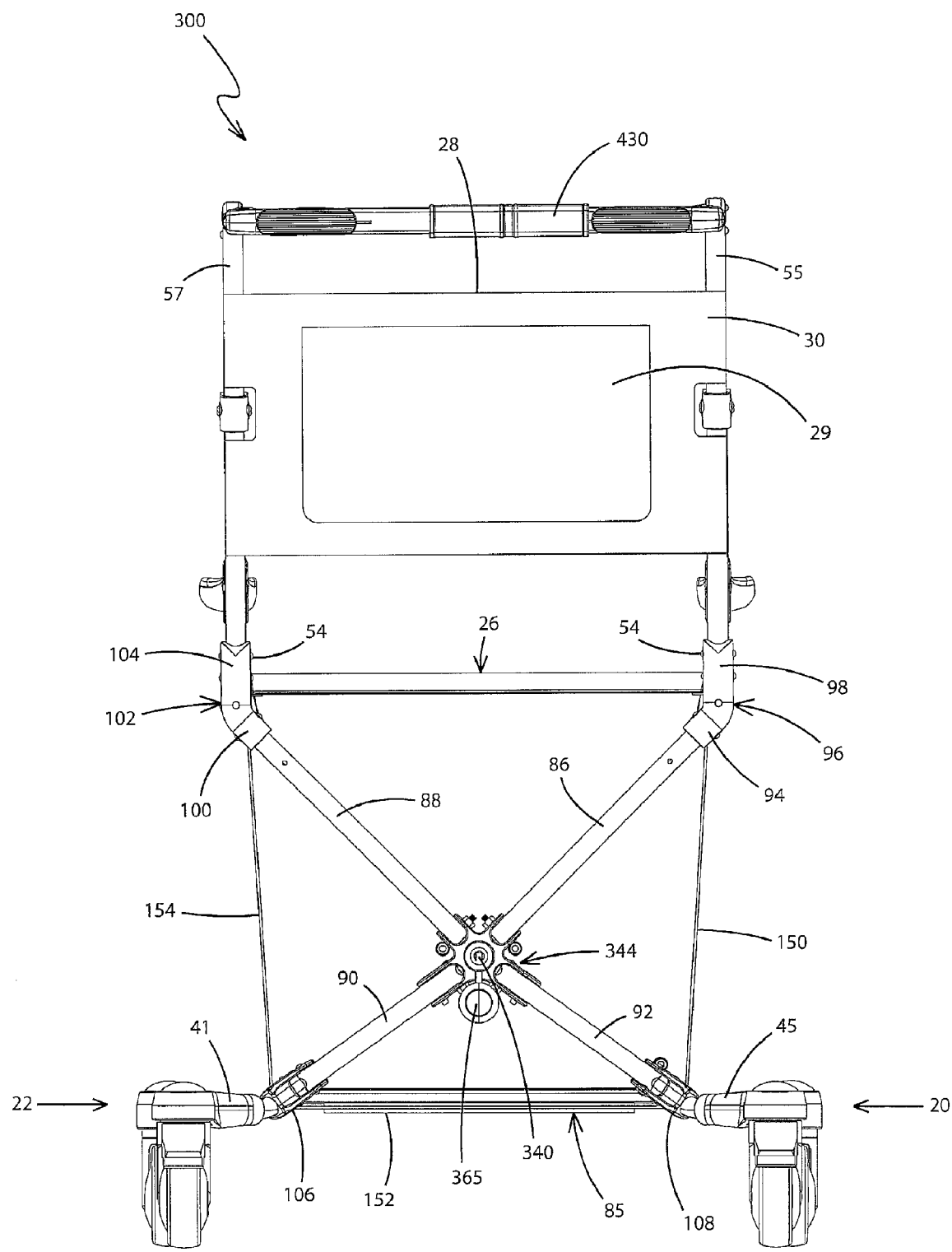
FIG. 21 is a rear elevational view of the chair of FIG. 18.

In the chair 300, the elongated member is in the form of a threaded shaft 336 in replacement of the main spar 36. As can be seen in FIG. 20, the threaded shaft 336 includes a front portion 361 defined frontwardly of the central mounting members 110, 112 through which the shaft 336 extends, and a rear portion 363 defined rearwardly of the central mounting members 110, 112. The front and rear portions 361, 363 are threaded in opposite directions.

The front and rear hubs 342, 344 are threadably engaged with, respectively, the front and rear portions 361, 363 of the shaft. The hubs 342, 344 each include a central threaded opening 358 (see FIG. 19) for receiving the shaft 336 therein, the threaded openings 358 being threaded in opposite directions such that upon rotation of the shaft 336, the hubs 342, 344 move in unison either both away or both toward the central mounting members 110, 112.

Figure 19:
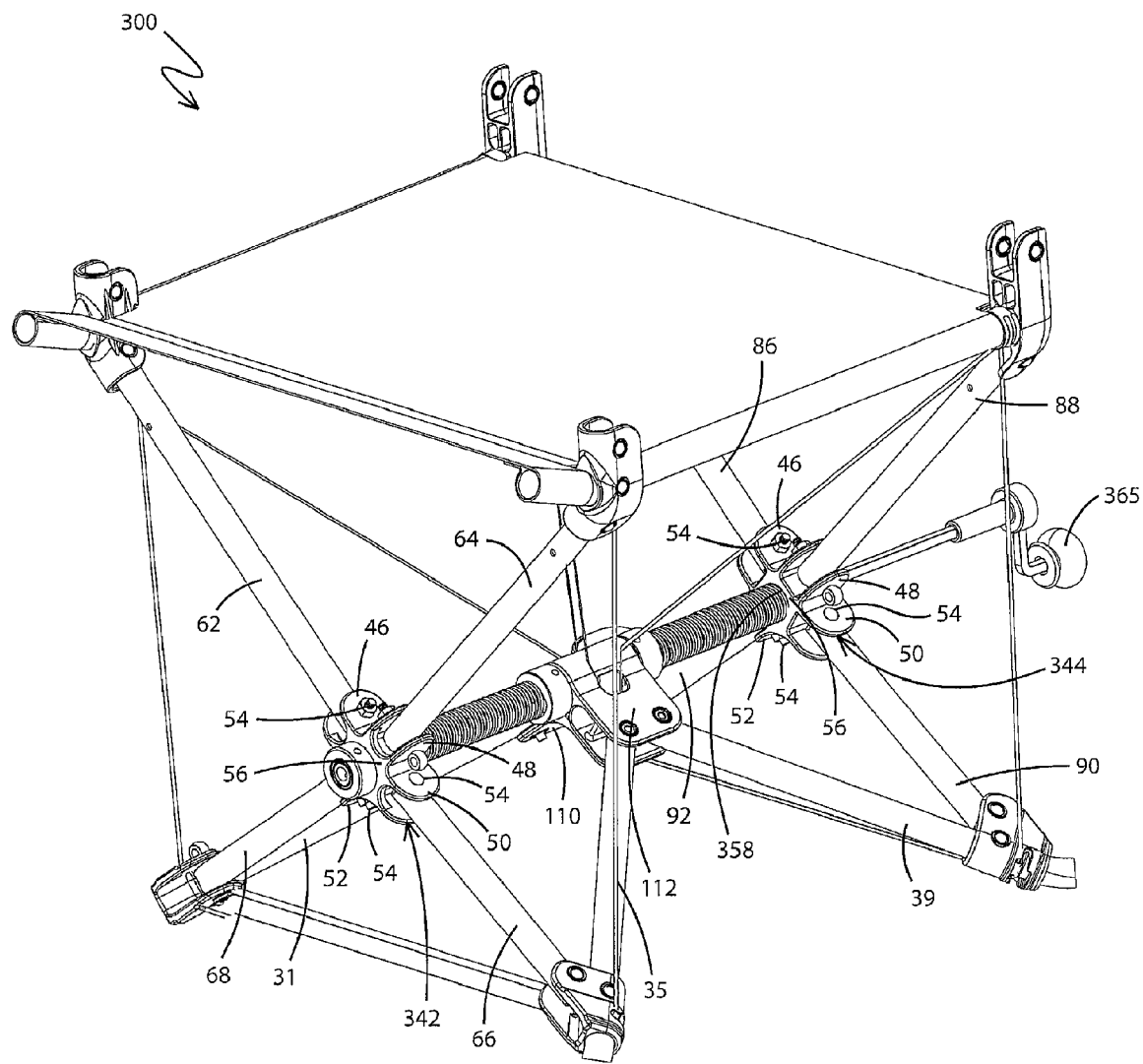
FIG. 19 is a fragmentary perspective view of the chair of FIG. 18.

Referring to FIG. 19, and like the hubs 42, 44 of the chair 10, the threaded hubs 342, 344 each include a first mount 46, a second mount 48, a third mount 50 and fourth mount 52, each extending radially outwardly from a central body 56 and receiving a respective one of the struts 62, 64, 66, 68, 86, 88, 90, 92.

Figure 18:
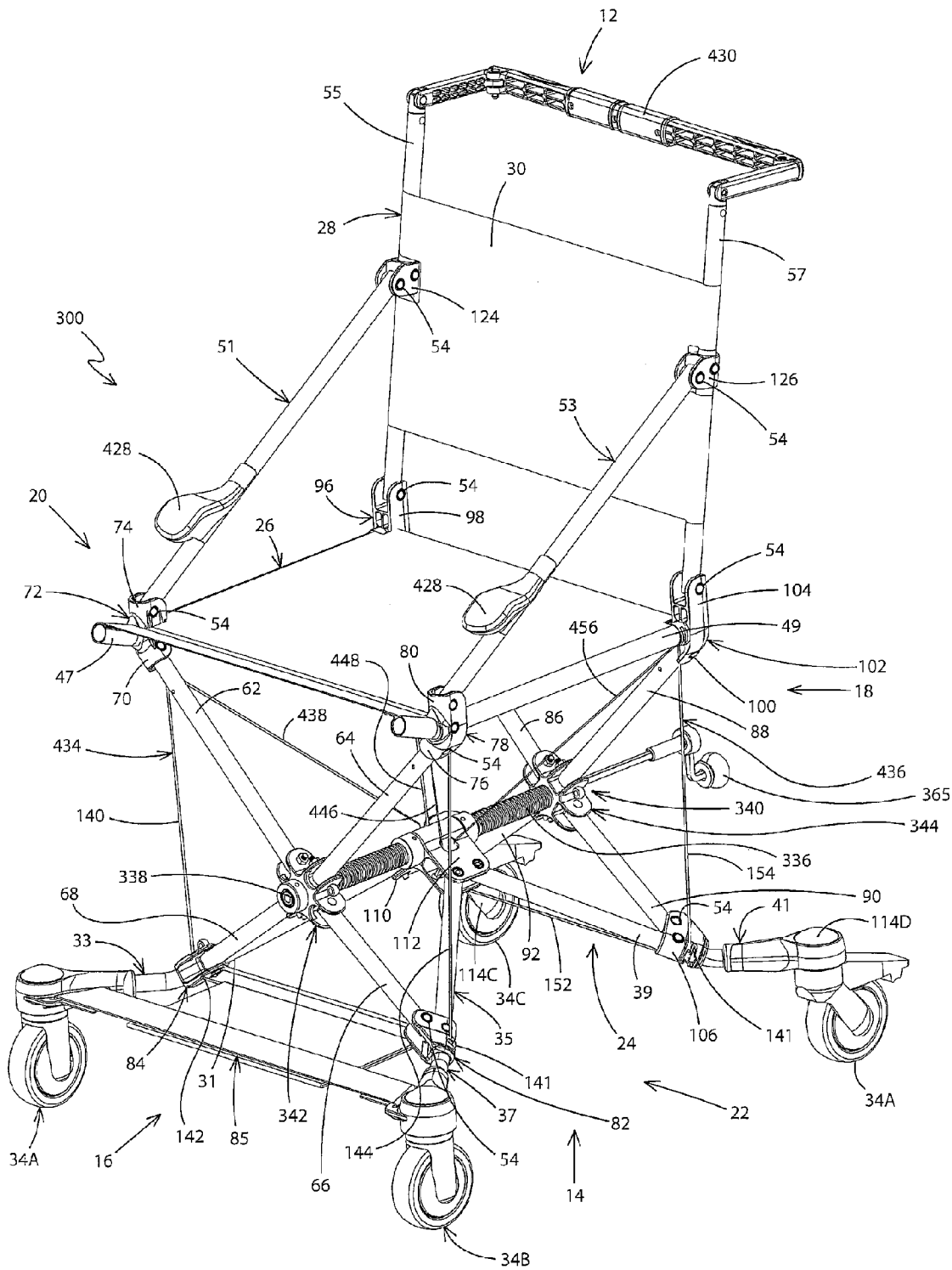
FIG. 18 is a perspective view of a chair in accordance with another alternate embodiment of the present invention.

In the embodiment shown, the chair 300 further includes a crank 365 slidably received within the hollow threaded shaft 336 and attached thereto such as to rotate integrally therewith. As such, when a user turns the crank 365 in the appropriate direction, the hubs 342, 344 are displaced toward one another in unison, and the chair 300 folds in the same manner as described above for the chair 10. FIG. 18, for example, shows the crank 365 in its extended position, while FIG. 20 shows the crank 365 in its retracted position. The crank 365 can either be inserted into the shaft 336 with a stop such as not to be extendable passed the desired extended position, or alternately be removable from inside the shaft 336.

As the hubs 342, 344 are naturally prevented from moving toward one another when the chair 300 is in its erected position through their threaded engagement with the threaded shaft 336, the buttons 60 are not necessary and as such are omitted.

Another difference between the chair 10 and the chair 300 resides in the configuration of the tension straps 434, 436.

In the chair 300, the second, third and fourth segments 140, 142, 144 of the first tension strap 434 and the second, third and fourth segments 150, 152, 154 of the second tension strap 436 are identical to their counterpart in the chair 10.

Figure 22:
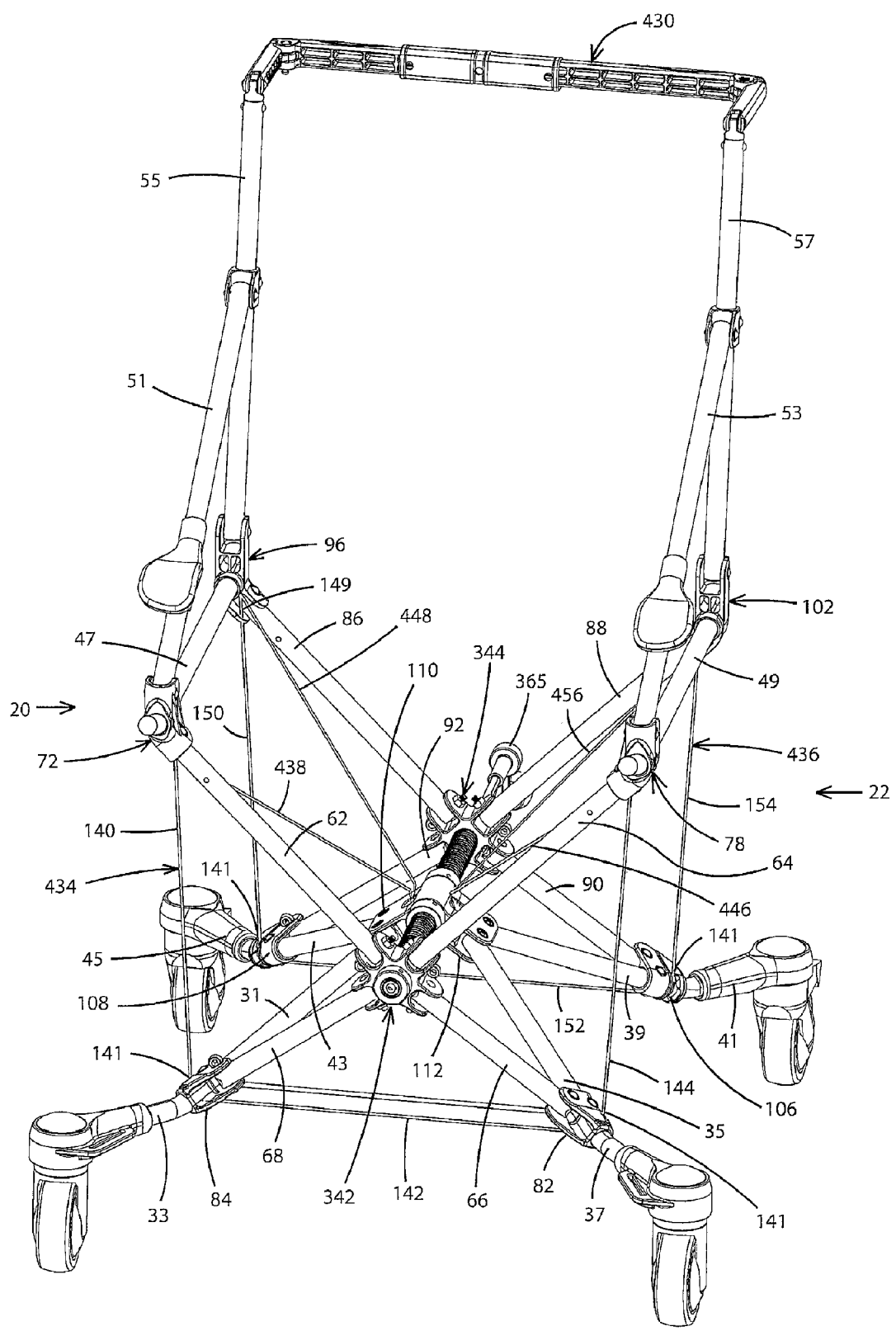
FIG. 22 is a perspective view of the chair of FIG. 18 from a more frontal angle with the seat member, back member and foot rest removed.
Figure 23:
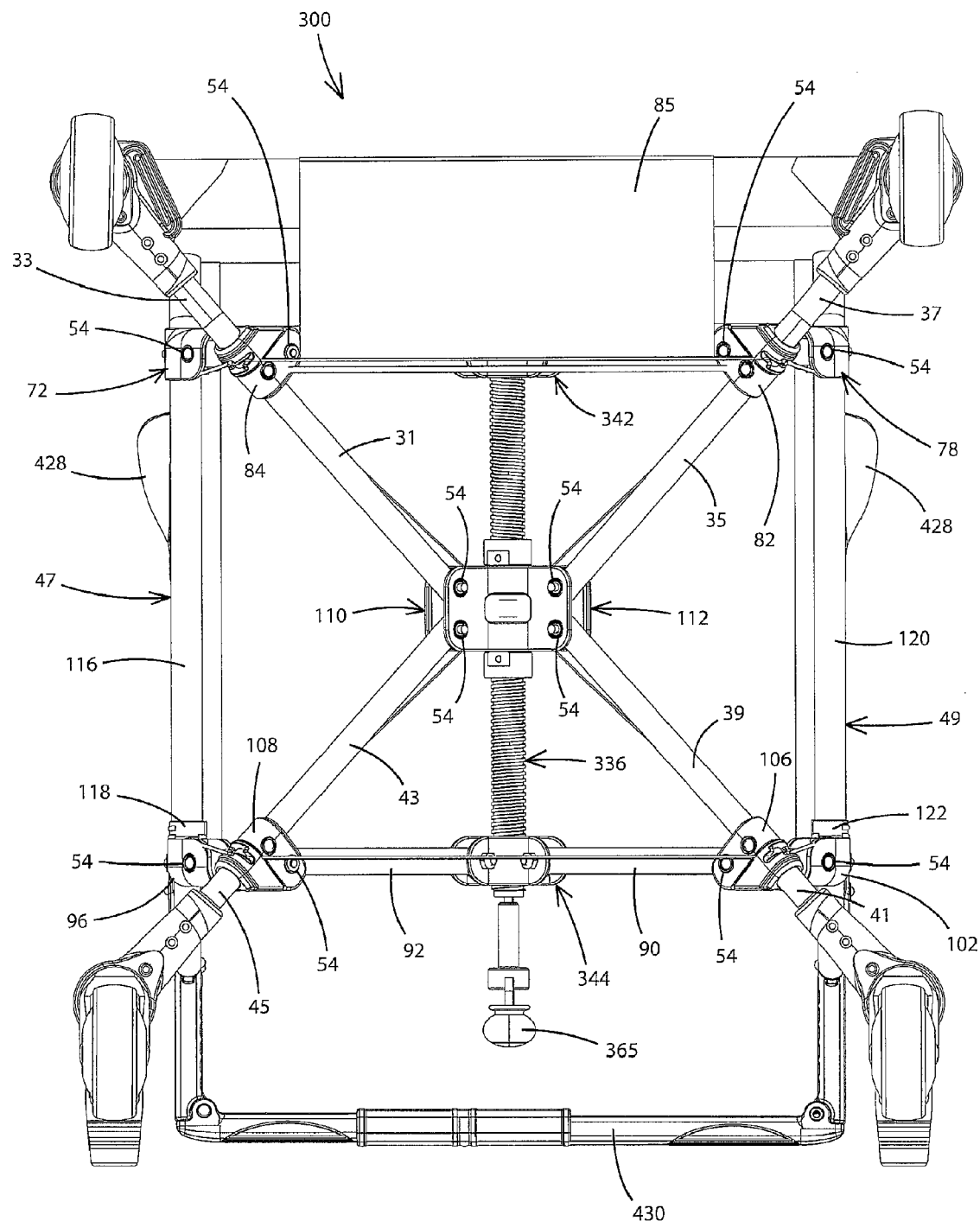
FIG. 23 is a bottom plan view of the chair of FIG. 18.
Figure 24:
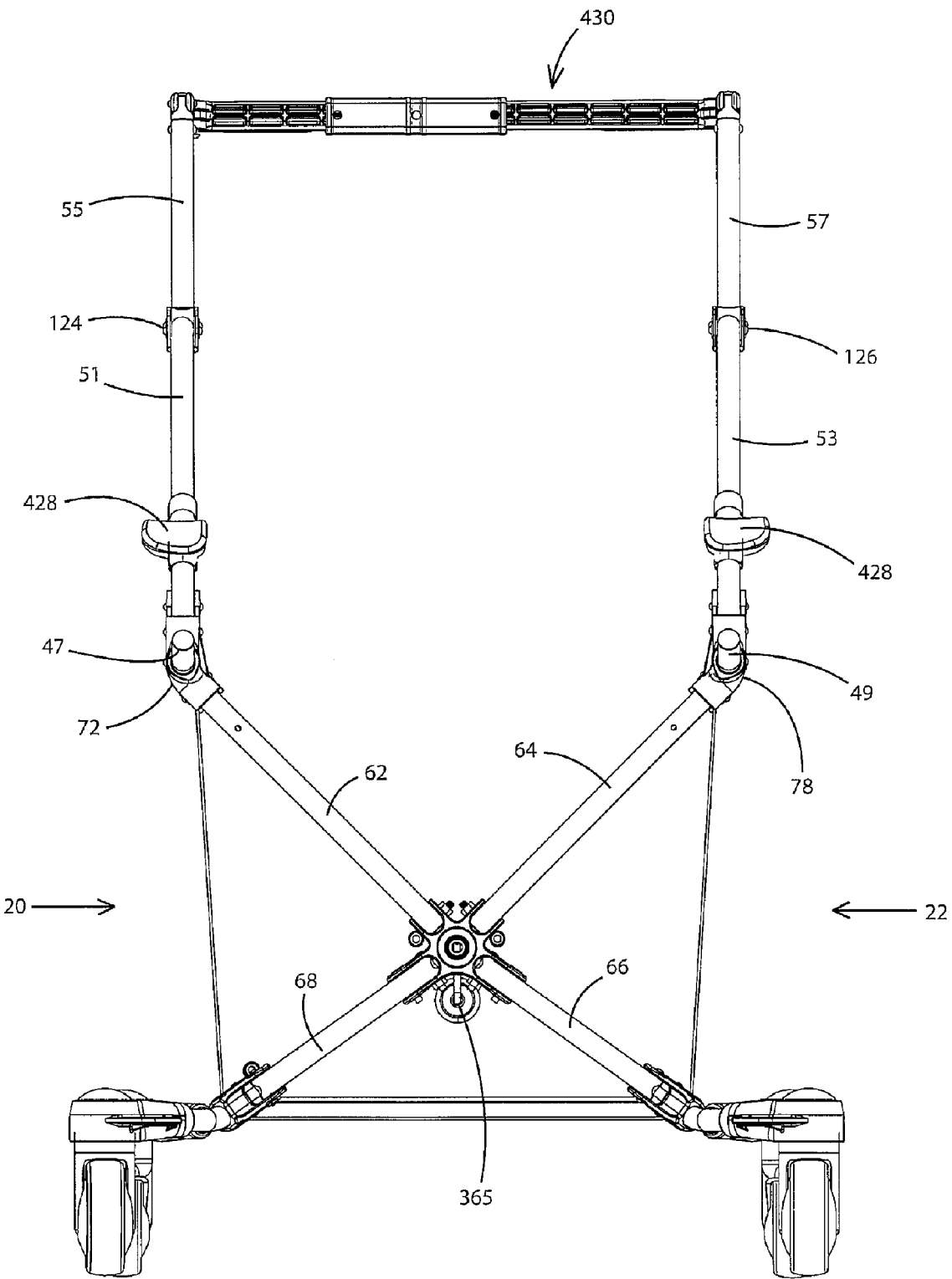
FIG. 24 is a front elevational view of the chair of FIG. 18 with the seat member, back member and foot rest removed.
Figure 25:
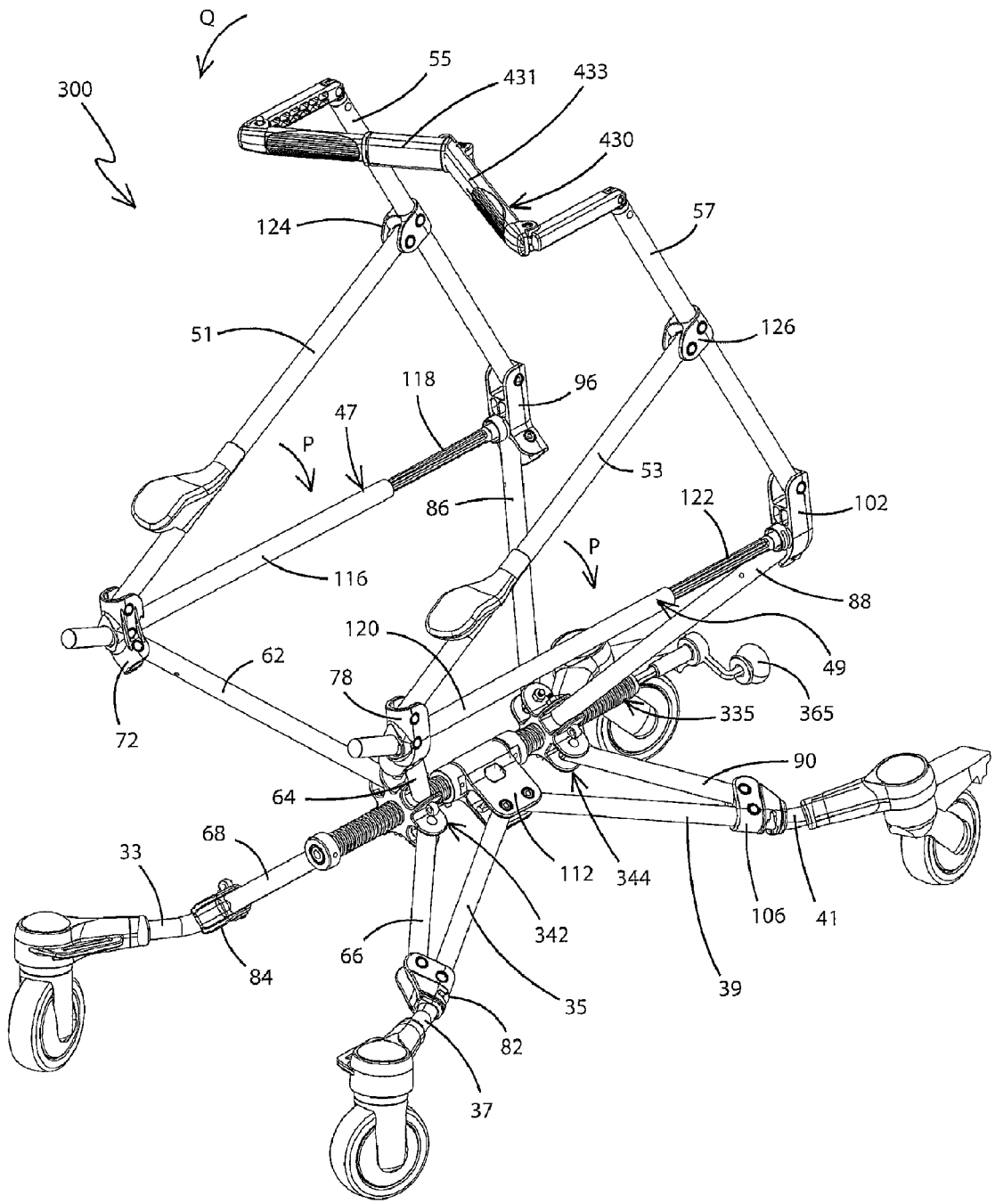
FIG. 25 is a perspective view showing an initial stage of collapse of the chair of FIG. 18.
Figure 26:
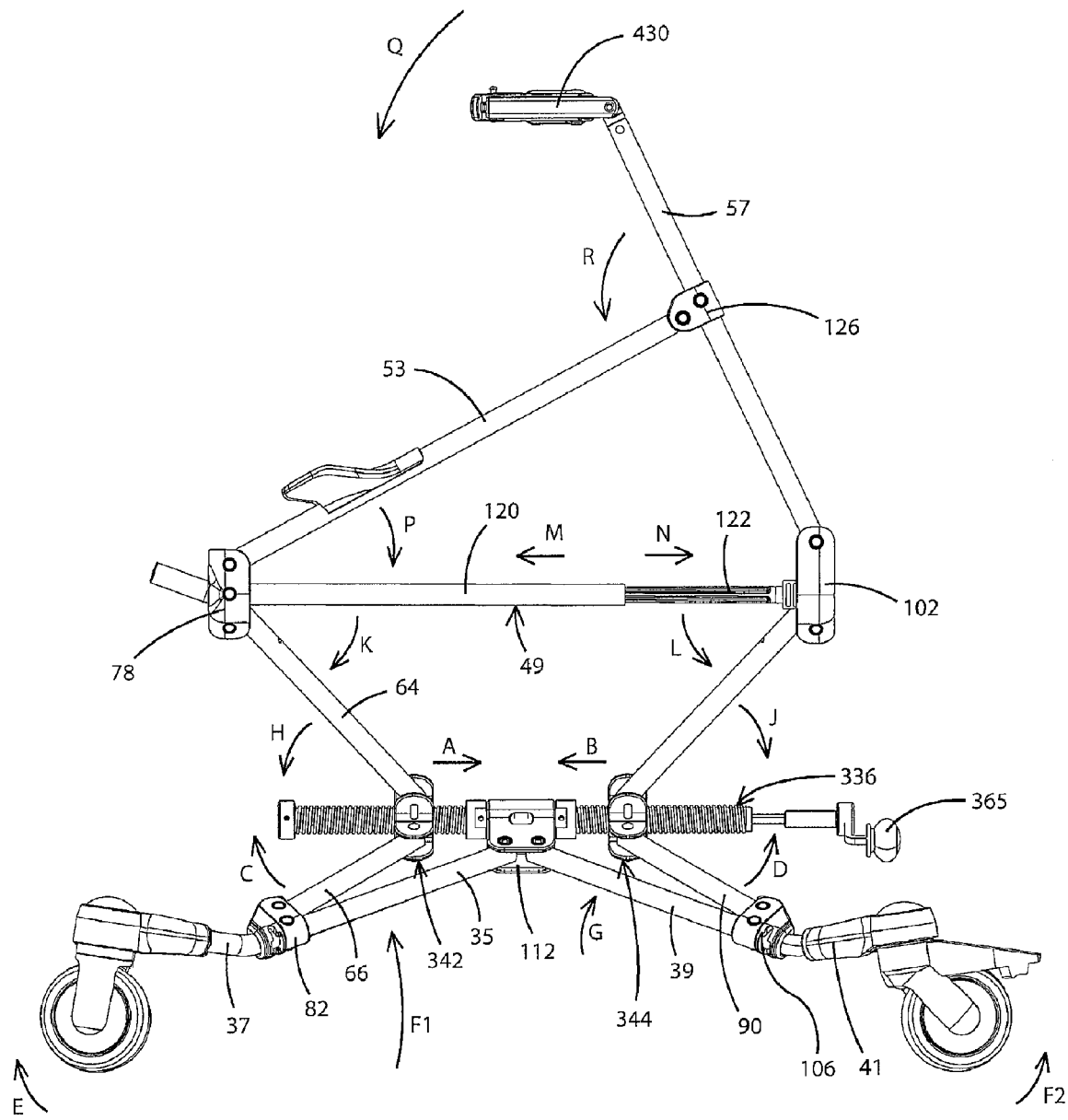
FIG. 26 is a side elevational view showing the initial stage of collapse of FIG. 25.
Figure 27:
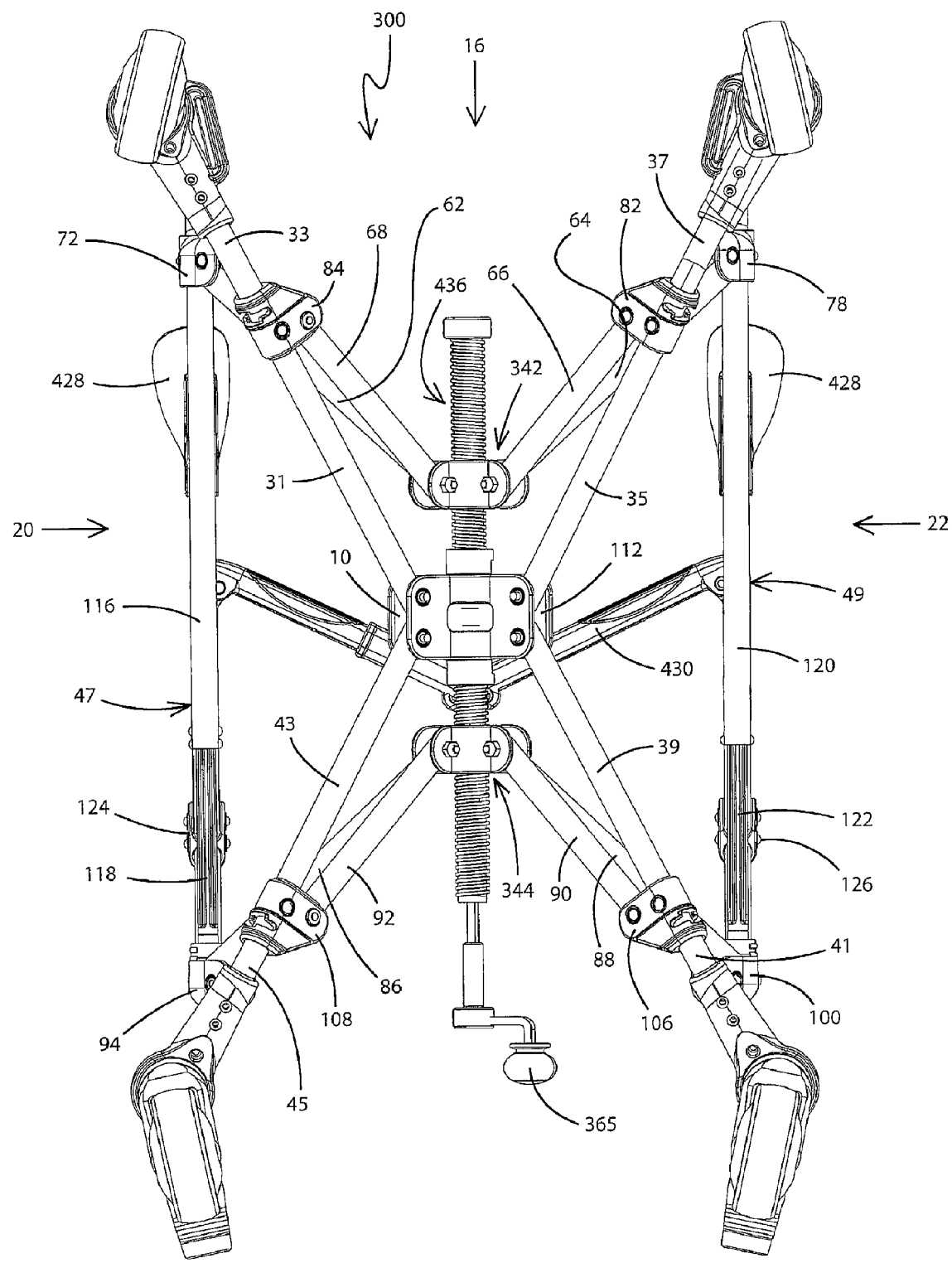
FIG. 27 is a bottom plan view showing the initial stage of collapse of FIGS. 25-26.
Figure 28:
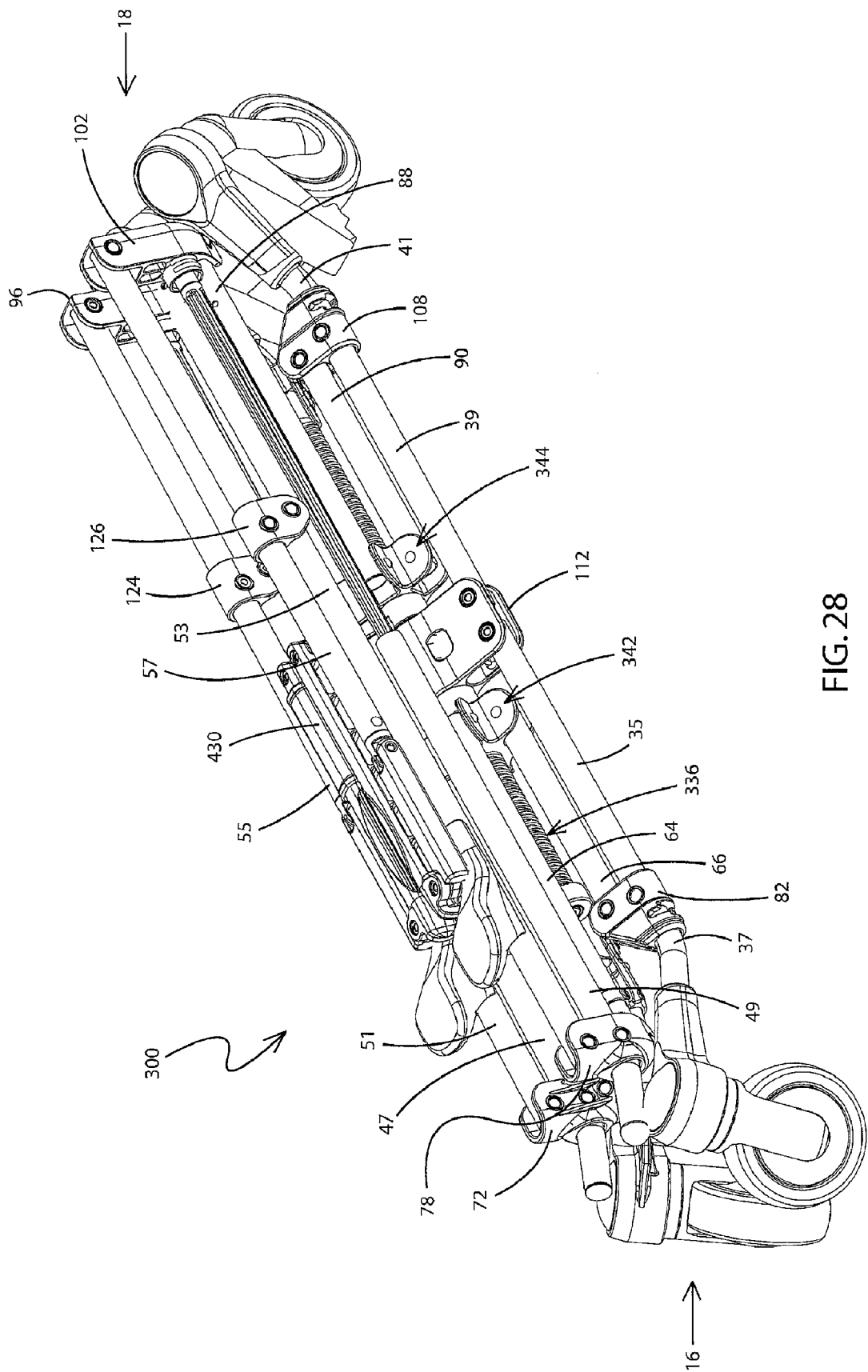
FIG. 28 is a perspective view of the chair of FIG. 18 in its collapsed position.
Figure 29:
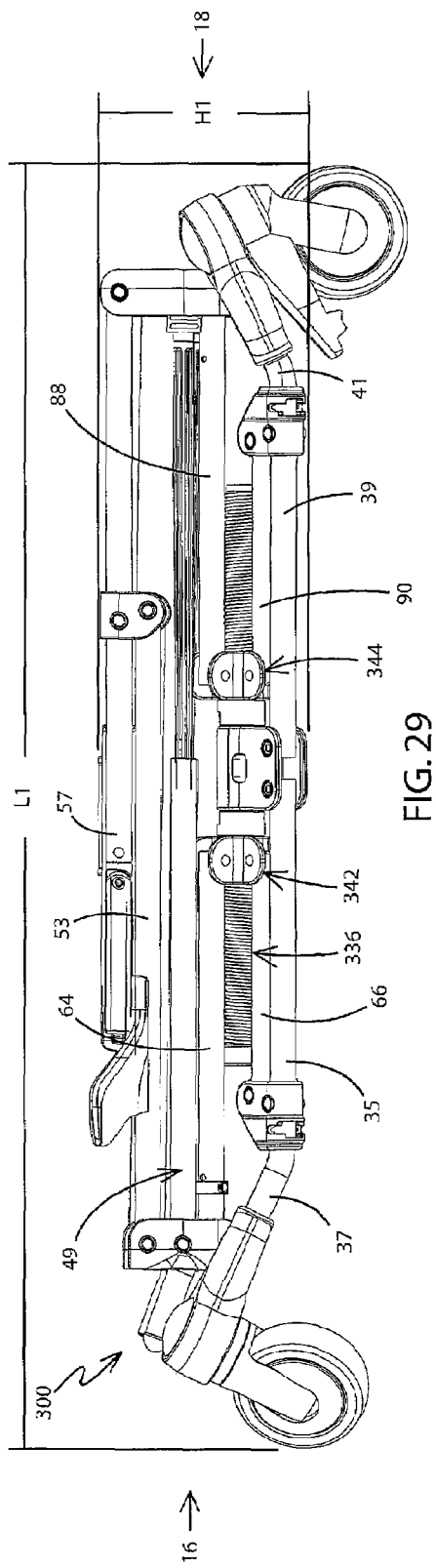
FIG. 29 is a side elevational view of the chair of FIG. 18 in its collapsed position.
Figure 30:
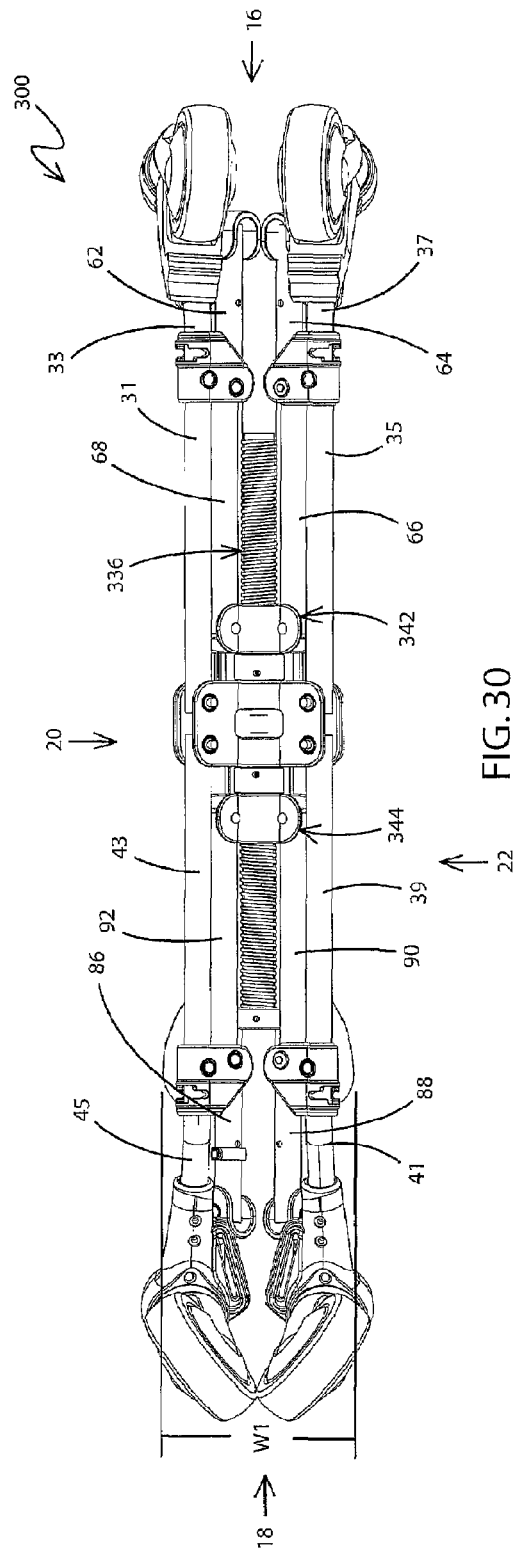
FIG. 30 is a bottom plan view of the chair of FIG. 18 in its collapsed position.

However, in the chair 300 and as can be more clearly seen in FIG. 22, the first segment 438 of the first tension strap 434 is connected to the mounting bracket 110 (instead of to the mount 46 of the rear hub 44) and extends upwardly and laterally outwardly toward the side 20 of frame 24 to a position adjacent the front end of the first seat pole 47. The strap 134 then loops over the top of first seat pole 47 through the bracket 72 (instead of forward of it) and then extends downwardly therefrom as the second strap segment 140.

Similarly, the fifth segment 446 extends through the bracket 78 and downwardly, rearwardly and laterally inward away from the side 22 to the mounting bracket 112 (instead of to mount 48 of the rear hub 44) where the strap 434 is attached.

Similarly to the first tension strap 434, the first segment 448 of the second tension strap 436 is connected to the mounting bracket 110 (instead of to the mount 46 of the front hub 42) and extends upwardly, rearwardly and laterally outwardly toward the side 20 to loop over the first seat pole 47.

The fifth segment 456 of the second tension strap 436 extends through the bracket 102 downwardly, forwardly and laterally inwardly away from the side 22 to connect to the mounting bracket 112 (instead of to the mount 48 of the front hub 42).

As such and contrary to the chair 10, the first segment 448 of the second strap 436 does not cross the first segment 438 of the first strap 434, and the fifth segment 456 of the second strap 436 does not cross the fifth segment 446 of the first strap 434. The forward collapsible assembly which includes the hub 342 is not connected to the rear collapsible assembly which includes the hub 344 through the straps 434, 436, as the threaded engagement of the hubs 342, 344 with the shaft 336 ensures that both assemblies are displaced in unison, eliminating the need for the straps to interconnect the hubs.

However and as is the case for the chair 10, each of the strap segments of the chair 300 may be replaced with a single individual strap, or any number of the segments may be a single strap.

In the chair 300, the pantographic assembly 59 is omitted. The rear panel 32 of the back member 28 is omitted, and the pocket 29 is mounted on a rear surface of the front panel 30 of the back member 28. This further reduces the total weight of the chair 300.

Like for the chair 10, the rear wheels 34C-D of the chair 300 are mounted to the frame 24 via castor wheel assemblies 114C-D. However, the front wheels 34A-D are mounted to the frame 24 in a fixed manner to improve directional tracking.

The hand grips 328 mounted on the arm poles 51, 53 differ from the hand grips 128 of the chair 10 in that they have a curved protruding portion providing for a more ergonomic shape.

The arcuate handles 130 of the chair 10 connected to the back poles 55, 57 are replaced by a collapsible push bar 430 interconnecting the upper ends of the back poles 55, 57. The handle bar 430 includes two articulated portions 431, 433, as can be best seen in FIG. 25, such that the handle bar 430 can be collapsed together with the chair 300.

Figure 31:
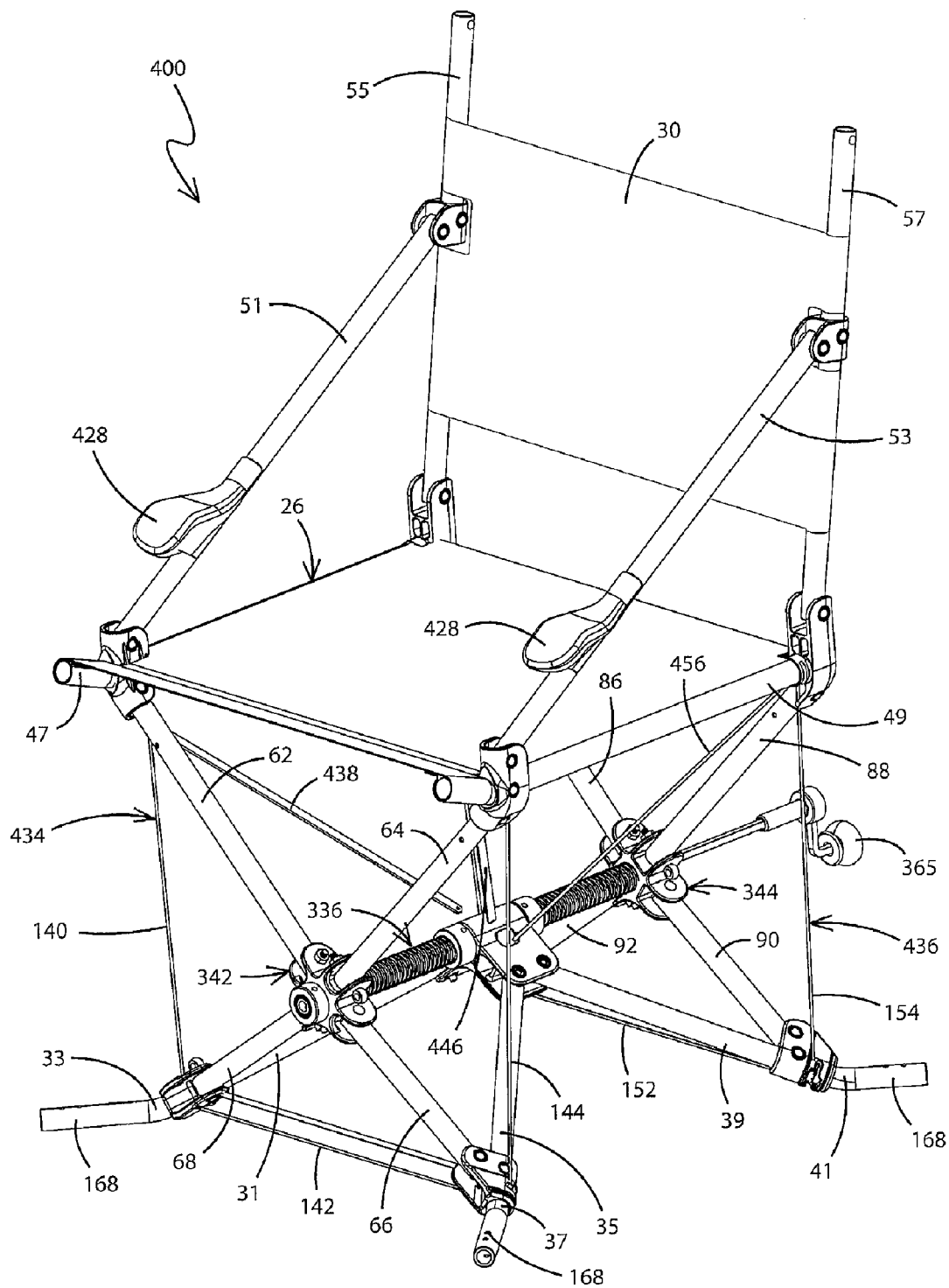
FIG. 31 is a perspective view of a chair in accordance with a further alternate embodiment of the present invention.
Figure 32:
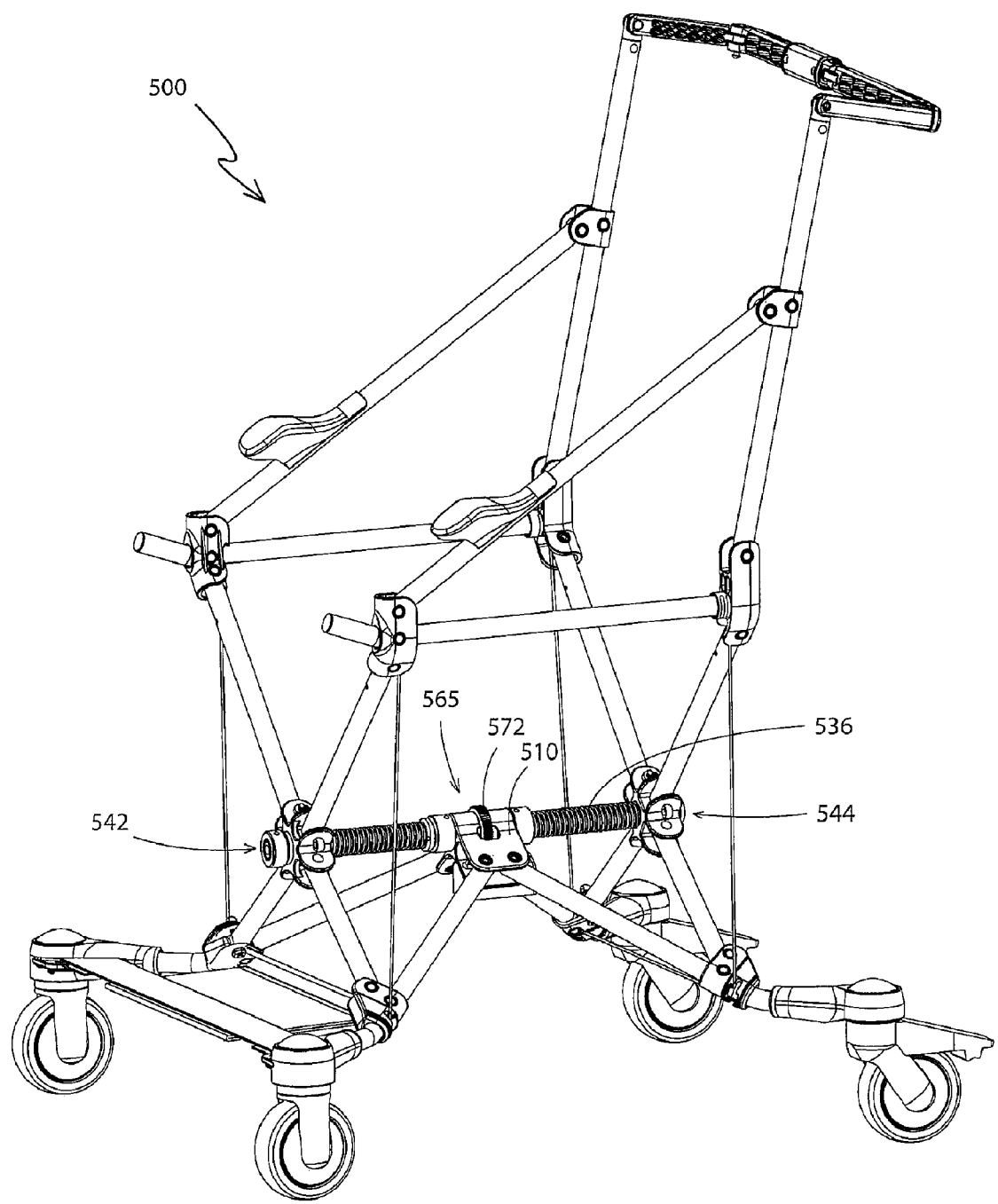
FIG. 32 is a perspective view of a chair in accordance with another alternate embodiment of the present invention.
Figure 33:
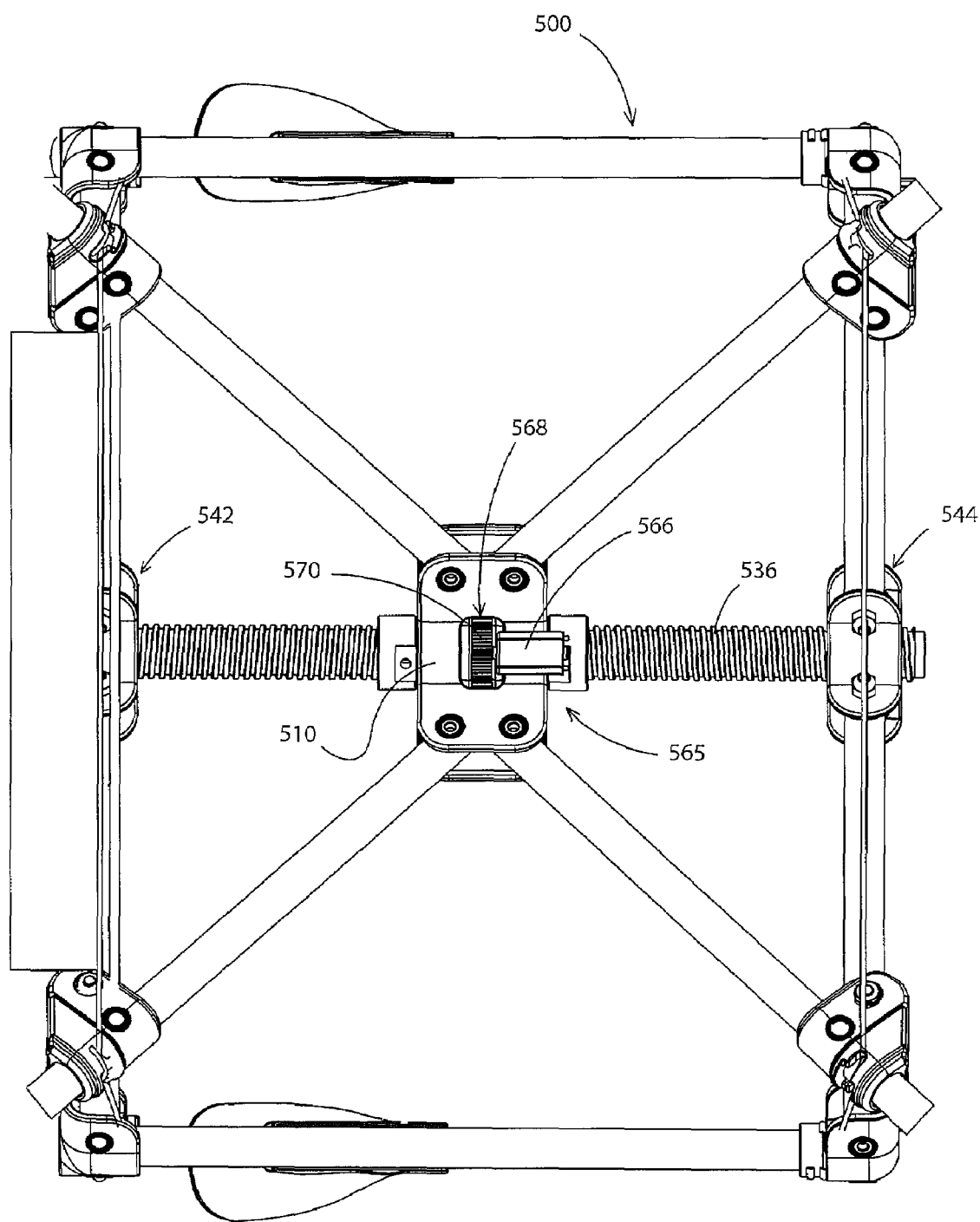
FIG. 33 is a bottom plan view of the chair of FIG. 32, shown with the motor drive cover removed.

FIG. 31 shows a chair 400 according to a further alternate embodiment of the present invention, which is similar to the chair 300 of FIGS. 18-30 except that the chair 400 does not include wheels and related mounting assemblies, and eliminates the foot rest 85 and the handle bar 430. Particularly, the wheels 34A-D and the assemblies 114C-D are replaced by end caps 16B which are configured for contacting the ground or other supporting surface. Similarly to the chair 200 of FIG. 17, the caps 168 are typically formed of plastic or a polymeric material. All other aspects of chair 400 are the same as the chair 300 previously described.

Referring now to FIGS. 32-36 showing a chair 500 according to another alternate embodiment of the present invention. The chair 500 is in many respects similar to the chairs of FIGS. 18-31 described above. Similar elements in both chairs will therefore not be further described. The chair 500 differs principally in that a motor drive system 565 is used to rotate the threaded shaft 536 rather than the manual crank 365. Thus, in the same manner as described above, when the threaded shaft 565 is rotated (in this case by a motor, rather than the manual crank), the hubs 542 and 544 are displaced towards and away from each other, depending on whether the chair is being collapsed or expanded, and the chair folds in the same manner as previously described.

The motorized system 565 includes an electric motor 566, which may be for example a small battery-powered electric motor driven by one or more batteries 580, that is coupled to a high gear reduction gear train 568 which interconnects the motor 566 and the threaded shaft 536. This may be a motor and gear train which is similar, for example, to the type commonly found in a typical small rechargeable drill. The battery or batteries 580 are preferably thus rechargeable, however non-rechargeable batteries and/or other electric power sources can also be used.

The gear train 568 includes, in one embodiment, a first gear 570 fixed to the output shaft of the electric motor 566 and a second gear 572 which is engaged on the central mounting portion 510 of the threaded shaft 536. Thus, actuation of the electric motor 566 drives the gear train 568 which causes the threaded shaft 536 to rotate. The electric motor 566, gear train 568 and battery 580 (or other electric power source) are contained within an enclosure 582 (see FIG. 6) which may be opened to provide access to the components and to replace or recharge the battery as required. It is to be understood that more or less gears may also be provided in the gear train 568.

Figure 34:
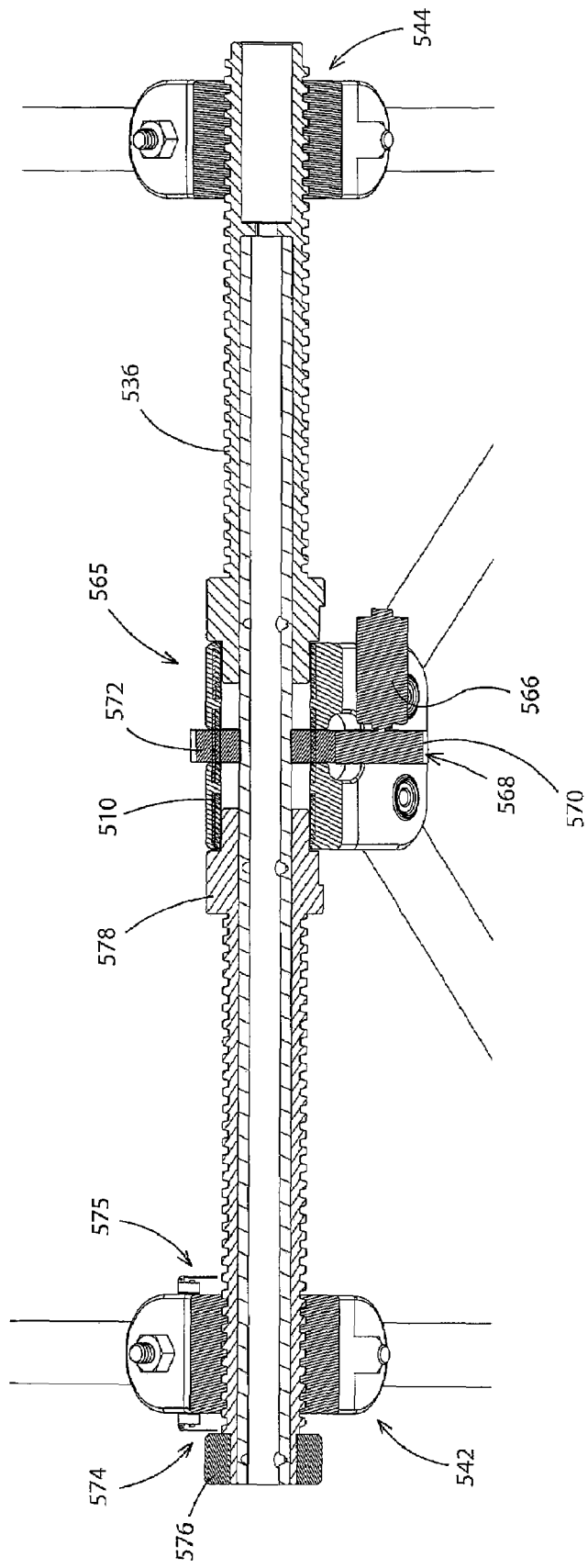
FIG. 34 is a cross-section view of the motor drive mechanism and threaded shaft of the chair of FIG. 32.
Figure 35:
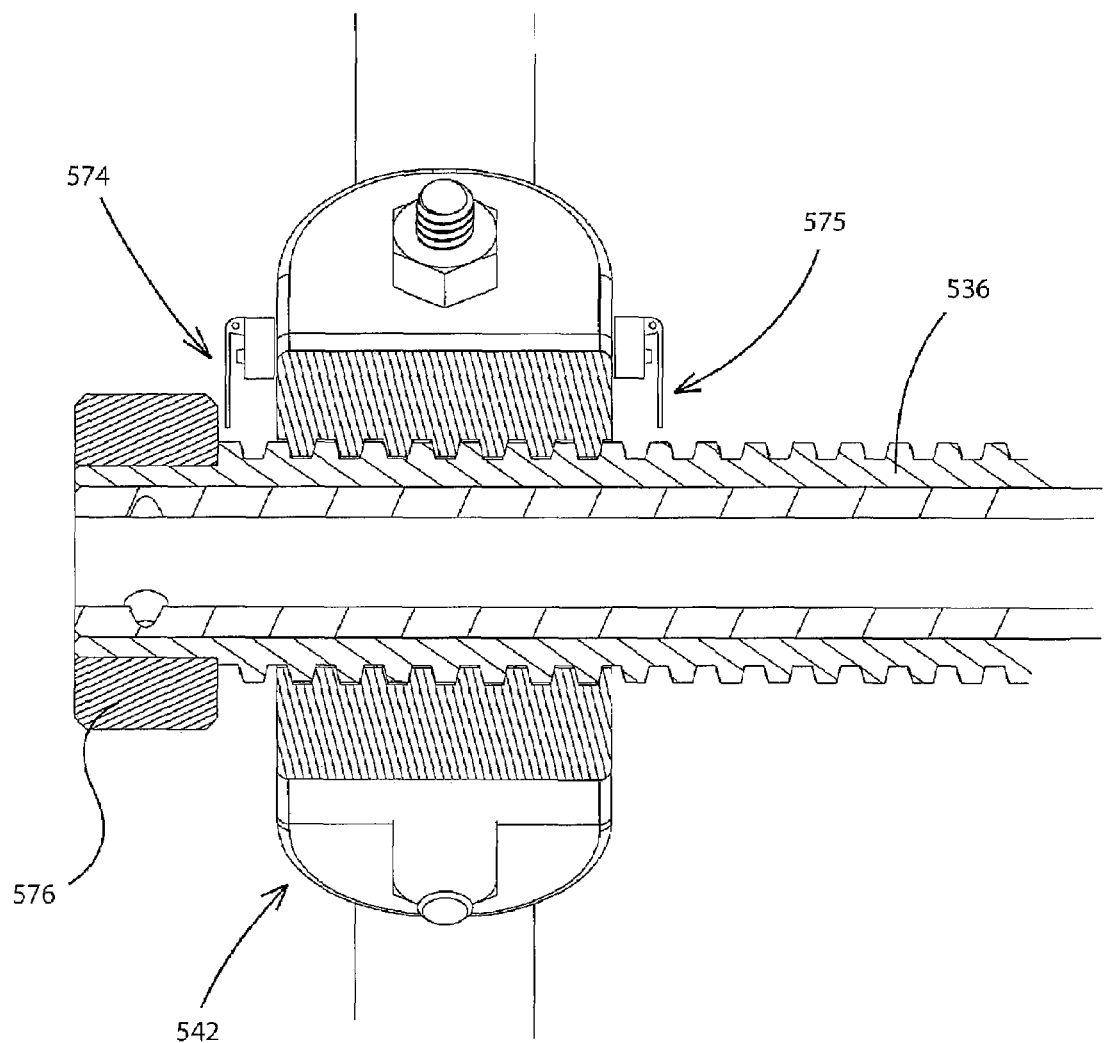
FIG. 35 is a partial, cross-sectional view of a hub which is displaceable on the threaded shaft and a limit switch of the motor drive mechanism of the chair of FIG. 32.
Figure 36:
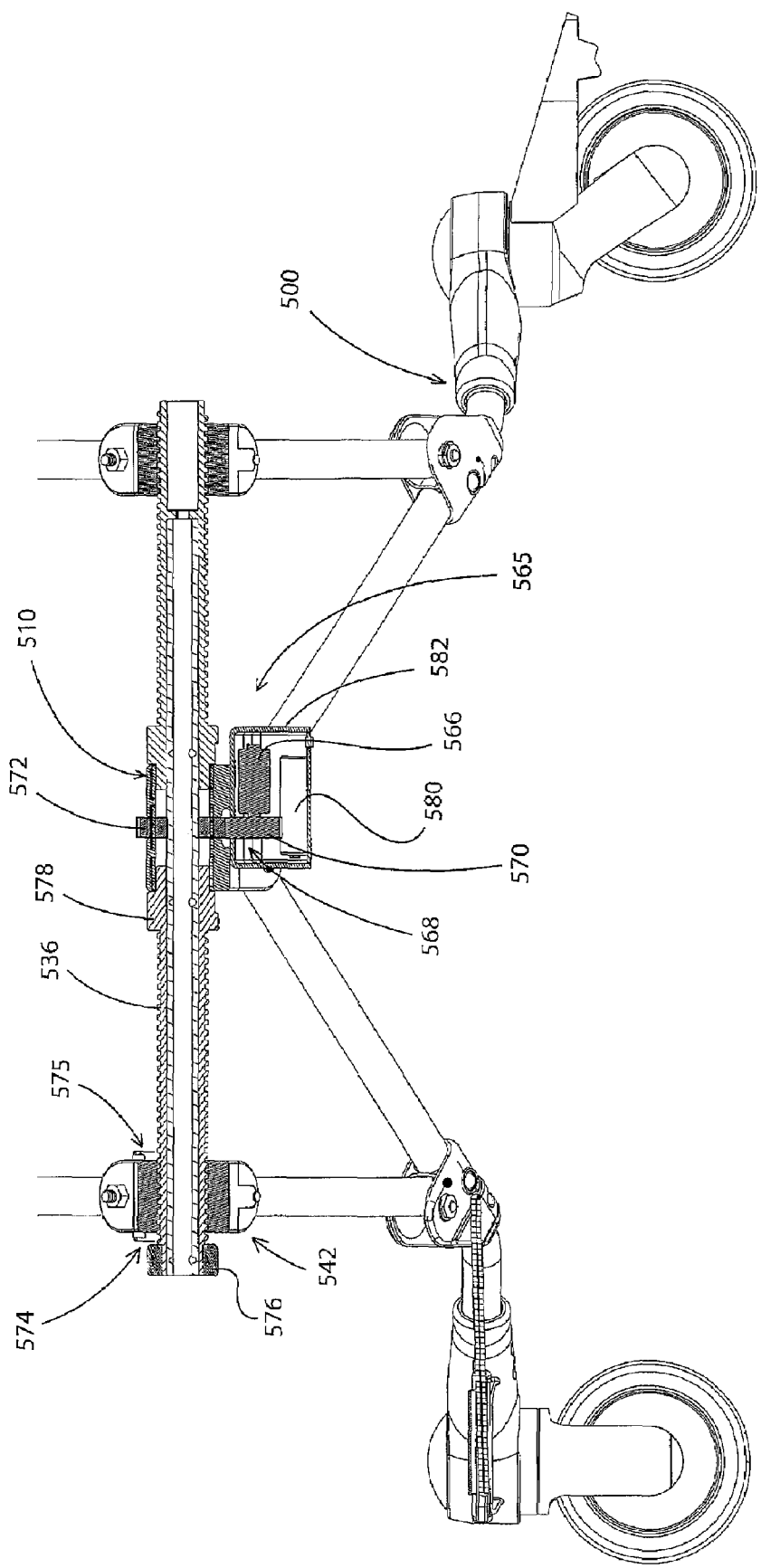
FIG. 36 is a partial, front elevation view of the chair of FIG. 32, showing the threaded shaft and motor drive mechanism in cross-section.

Sensors, in the form of limit switches in the depicted embodiment, are also provided to detect when the chair is in the fully erected and fully collapsed positions, such as to stop the motor 566 accordingly. As seen in FIG. 34-36, two small micro switches 574 and 575 are provided on the hub 542 such as to detect the end positions of the mechanism. In operation, once the motor has driven the shaft such as to displace the chair into the fully erected position (i.e. with the hubs at the furthest outer points on the shaft), an end knob 576 at the end of the shaft 536 abuts against the outer limit switch 574, thereby stopping the motor 566 and thus ceasing rotation of the shaft 536. Similarly, when the motor 566 is driven in the opposite direction, thereby rotating the shaft in the opposite direction, the hubs 542 and 544 are displaced inwardly on the shaft 536 until such time as the inner limit switch 575 abuts a flange 578 on the central mounting portion 510, thereby activating the switch and stopping the motor. Although contact limit switches 574, 575 are shown in this embodiment, other forms of limit or control switches which serve to stop the motor when desired can also be used.

The motor 566 may be turned on by any suitable actuation means, including an on switch (not shown) in the form of a push-button or toggle switch, or by an alternate type of command-receiving structure operable to start the motor in the desired direction. This may also be done remotely via a remote control.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An apparatus comprising a support structure movable between an erected position and a collapsed position and comprising a threaded shaft, a first collapsible assembly having a first portion pivotally mounted on the threaded shaft through a first hub, a second collapsible assembly having a second portion pivotally mounted on the threaded shaft through a second hub, at least one of the first and second hubs being threadably engaged to the threaded shaft such that the first and second hubs are relatively movable toward and away from each other through a rotation of the threaded shaft to move the support structure between the erected and collapsed positions, the first collapsible assembly including first and second struts pivotally mounted on the first hub, the second collapsible assembly including third and fourth struts pivotally mounted on the second hub, the apparatus further comprising a first seat pole pivotally connected to the first and third struts, a second seat role pivotally connected to the second and fourth struts, and a seat connected to the first and second seat poles and adapted for the seating of a person thereon.

2. The apparatus of claim 1, further comprising a crank rotationally connected to the threaded shaft such as to rotate integrally therewith, the crank being at least partially slidably received within a hollow portion of the threaded shaft.

3. The apparatus of claim 1, further comprising a motor assembly rotating the threaded shaft.

4. The apparatus of claim 3, further comprising limit sensors for stopping the motor when the support structure reaches the erected and collapsed positions.

5. The apparatus of claim 1 further comprising a flexible tension strap extending between first and second locations disposed on the support structure, and wherein the strap is under tension in the erected position to bias the first and second locations toward one another.

6. The apparatus of claim 1 further comprising a first arm pole pivotally connected to the first seat pole, a first back pole pivotally connected to the first seat pole and to the first arm pole, a second arm pole pivotally connected to the second seat pole, a second back pole pivotally connected to the second seat pole and to the second arm pole, and a back member connected to the first and second back poles and adapted for the person's back to lean against.

7. The apparatus of claim 1 wherein the first collapsible assembly comprises a third portion and the second collapsible assembly comprises a fourth portion, and wherein during movement of the support structure from the erected position to the collapsed position the first and second portions relatively move toward one another and the third and fourth portions relatively move away from each other, and further comprising a leg assembly adapted for contacting a support surface and having first and second legs, the first leg being pivotally connected to the third portion, and the second leg being pivotally connected to the fourth portion.

8. The apparatus of claim 1 wherein the first collapsible assembly comprises a third portion and the second collapsible assembly comprises a fourth portion, and wherein during movement of the support structure from the erected position to the collapsed position the first and second portions relatively move toward one another and the third and fourth portions relatively move away from each other, the first and second seat poles respectively corresponding to first and second telescoping poles each having first and second segments slidably connected to one another, the first segments of the first and second telescoping poles being pivotally connected to the third portion and the second segments of the first and second telescoping poles being pivotally connected to the fourth portion.

9. The apparatus of claim 1 further comprising a central structure disposed intermediate the first and second hubs, and a leg assembly adapted for contacting a support surface and comprising first, second, third and fourth legs which are pivotally connected to and extend radially outwardly from the central structure.

10. The apparatus of claim 9 further comprising a fifth strut pivotally connected to the first hub and the first leg, a sixth strut pivotally connected to the first hub and the second leg, a seventh strut pivotally connected to the second hub and the third leg, and an eighth strut pivotally connected to the second hub and the fourth leg.

11. The apparatus of claim 10 wherein the seat poles, the threaded shaft, the legs and the struts are parallel to one another in the collapsed position.

12. An apparatus comprising a support structure movable between an erected position and a collapsed position and comprising a threaded shall, a first collapsible assembly having a first portion pivotally mounted on the threaded shaft through a first hub, a second collapsible assembly having a second portion pivotally mounted on the threaded shaft through a second hub, at least one of the first and second hubs being threadably engaged to the threaded shall such that the first and second hubs are relatively movable toward and away from each other through a rotation of the threaded shaft to move the support structure between the erected and collapsed positions, the first collapsible assembly including a first strut pivotally mounted on the first hub, the second collapsible assembly including a second strut pivotally mounted on the second hub, the apparatus further comprising a leg assembly adapted for contacting a support surface and comprising first and second legs pivotally mounted on the threaded shaft, wherein the first leg is pivotally connected to the first strut and the second leg is pivotally connected to the second strut.

13. The apparatus of claim 12 further comprising first and second seat poles, the first collapsible assembly including third and fourth struts pivotally connected to the first hub wherein one of the third and fourth struts is pivotally connected to the first seat pole and another of the third and fourth struts is pivotally connected to the second seat pole, the second collapsible assembly including fifth and sixth struts pivotally connected to the second hub wherein one of the fifth and sixth struts is pivotally connected to the first seat pole and another of the fifth and sixth struts is pivotally connected to the second seat pole, and a seat connected to the first and second seat poles and adapted for the seating of a person thereon.

14. The apparatus of claim 12 further comprising third and fourth legs pivotally mounted on the threaded shaft, a third strut pivotally connected to the first hub and the third leg, a fourth strut pivotally connected to the second hub and the fourth leg, first and second seat poles, a fifth strut pivotally connected to the first hub and the first seat pole, a sixth strut pivotally connected to the first hub and the second seat pole, a seventh strut pivotally connected to the second hub and the first seat pole, and an eighth strut pivotally connected to the second hub and the second seat pole, the first and second seat poles being adapted to support a seat for the seating of a person thereon.

15. The apparatus of claim 14 further comprising a first arm pole, a first back pole pivotally connected to the first arm pole, a second arm pole, a second back pole pivotally connected to the second arm pole, wherein the first arm pole and the first back pole are pivotally connected to the first seat pole, and the second arm pole and the second back pole are pivotally connected to the second seat pole, the first and second back poles being adapted to support a back member for the person's back to lean against.

16. The apparatus of claim 14 wherein the seat poles, the threaded shaft, the legs and the struts are parallel to one another in the collapsed position.

17. The apparatus of claim 12, further comprising a crank rotationally connected to the threaded shaft such as to rotate integrally therewith, the crank being at least partially slidably received within a hollow portion of the threaded shaft.

18. The apparatus of claim 12, further comprising a motor assembly rotating the threaded shaft.

19. A collapsible chair being alternately configurable in an erected position and a collapsed position, the chair comprising a rotatable threaded shaft, first and second hubs threadably engaged to the threaded shaft to be relatively movable therealong in opposite directions during movement between the erected and collapsed positions through rotation of the threaded shaft, a first collapsible assembly pivotally mounted on the first hub, a second collapsible assembly pivotally mounted on the second hub, a first seat pole interconnecting the first and second collapsible assemblies, a second seat pole interconnecting the first and second collapsible assemblies, a length of the first and second seat poles varying during the movement between the erected and collapsed positions, and a seat member retained on the first and second seat poles.

20. The chair of claim 19, further comprising a central member located at a fixed position along the threaded shaft, each of the first and second collapsible assemblies being pivotally connected to the central member.

21. The chair of claim 19, further comprising a first back pole pivotally connected to the first seat pole at a first location, a first arm pole pivotally connected to the first back pole and to the first seat pole at a second location, a second back pole pivotally connected to the second seat pole at a third location, a second arm pole pivotally connected to the second back pole and to the second seat pole at a fourth location, and a back member retained by the first and second back poles, the variation in the length of the first and second seat poles causing a variation in a distance between the first and second locations and in a distance between the third and fourth locations.

* * * * *

UNITED STATES PATENT AND TRADEMARK OFFICE
CERTIFICATE OF CORRECTION

PATENT NO.         : 7,607,724 B2                                         Page 1 of 1
APPLICATION NO.    : 11/838523
DATED              : October 27, 2009
INVENTOR(S)        : Robert G. Dickie and Steve A. Copeland It is certified that error appears in the above-identified patent and that said Letters Patent is hereby corrected as shown below:

Column 4, line 50, --adjacent its cuter-- should read --adjacent its outer--

Column 6, line 62, --struts 62, 64, 66 and 6B-- should read --struts 62, 64, 66 and 68--

Column 13, line 20, --Referring to FIGS. 13-30-- should read --Referring to FIGS. 18-30--

Column 15, line 2, --end caps 16B-- should read --end caps 168--

Column 16, line 26, --a second seat role-- should read --a second seat pole--

Signed and Sealed this

Seventeenth Day of August, 2010

David J. Kappos
*Director of the United States Patent and Trademark Office*